US011305874B2

(12) United States Patent
Beckman et al.

(10) Patent No.: US 11,305,874 B2
(45) Date of Patent: Apr. 19, 2022

(54) AERIAL VEHICLE ADAPTABLE PROPELLER BLADES

(71) Applicant: Amazon Technologies, Inc., Seattle, WA (US)

(72) Inventors: Brian C. Beckman, Newcastle, WA (US); John Raymond Brodie, Seattle, WA (US); Vedran Coralic, Seattle, WA (US); Taylor David Grenier, Seattle, WA (US); Gur Kimchi, Bellevue, WA (US); Dominic Timothy Shiosaki, Seattle, WA (US); Ricky Dean Welsh, Bellevue, WA (US); Richard Philip Whitlock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 766 days.

(21) Appl. No.: 15/194,480

(22) Filed: Jun. 27, 2016

(65) Prior Publication Data
US 2017/0274978 A1    Sep. 28, 2017

Related U.S. Application Data

(63) Continuation-in-part of application No. 15/078,899, filed on Mar. 23, 2016.

(51) Int. Cl.
*B64C 39/02* (2006.01)

(52) U.S. Cl.
CPC ...... *B64C 39/024* (2013.01); *B64C 2201/027* (2013.01); *B64C 2201/108* (2013.01); *B64C 2220/00* (2013.01)

(58) Field of Classification Search
CPC .............. B64C 11/48; B64C 2201/108; B64C 2201/08; B64C 11/50; B64C 39/024; B64C 2003/445; B64C 3/52; B64C 3/56; F05D 2300/505; F05B 2240/31; F05B 2240/311; F05B 2240/312; F05B 2240/313; F05B 2280/5006
(Continued)

(56) References Cited

U.S. PATENT DOCUMENTS

| 623,424 A | 4/1899 | Pieri |
|---|---|---|
| 1,370,876 A | 3/1921 | Caspar |

(Continued)

FOREIGN PATENT DOCUMENTS

| CH | 677844 | 6/1991 |
|---|---|---|
| CN | 101934858 A | 1/2011 |

(Continued)

OTHER PUBLICATIONS

Search Report dated Jun. 3, 2021, from 1st office action in corresponding Chinese Application No. 201780023492.8.

*Primary Examiner* — Eldon T Brockman
*Assistant Examiner* — Danielle M. Christensen
(74) *Attorney, Agent, or Firm* — Athorus, PLLC

(57) ABSTRACT

Sounds are generated by an aerial vehicle during operation. For example, the motors and propellers of an aerial vehicle generate sounds during operation. Disclosed are systems, methods, and apparatus for actively adjusting the position and/or configuration of one or more propeller blades of a propulsion mechanism to generate different sounds and/or lifting forces from the propulsion mechanism.

11 Claims, 18 Drawing Sheets

(58) Field of Classification Search
USPC .......................................................... 416/155
See application file for complete search history.

(56) References Cited

U.S. PATENT DOCUMENTS

| | | | |
|---|---|---|---|
| 1,552,742 A | | 9/1925 | Howard |
| 1,922,866 A | | 8/1933 | Sandor et al. |
| 3,384,183 A | * | 5/1968 | Braverman ............... B64C 3/30 |
| | | | 416/84 |
| 3,409,249 A | | 11/1968 | Raymond et al. |
| 3,554,467 A | | 1/1971 | Yowell |
| 3,768,923 A | | 10/1973 | Fradenburgh |
| 4,676,459 A | | 6/1987 | Seefluth |
| 4,710,101 A | | 12/1987 | Jamieson |
| 5,004,189 A | * | 4/1991 | Igram ...................... B64C 3/48 |
| | | | 244/219 |
| 5,190,441 A | | 3/1993 | Murphy et al. |
| 5,453,943 A | | 9/1995 | Magliozzi |
| 5,620,304 A | | 4/1997 | Matsuka et al. |
| 5,655,879 A | | 8/1997 | Kiely et al. |
| 5,735,670 A | | 4/1998 | Moffitt et al. |
| 5,961,067 A | | 10/1999 | Hall et al. |
| 6,152,405 A | * | 11/2000 | Muller ..................... B64C 3/48 |
| | | | 244/212 |
| 6,622,962 B1 | | 9/2003 | White |
| 7,828,523 B2 | * | 11/2010 | Bonnet ................ F03D 1/0633 |
| | | | 416/1 |
| 8,464,511 B1 | | 6/2013 | Ribarov et al. |
| 8,505,846 B1 | | 8/2013 | Sanders |
| 8,827,644 B2 | * | 9/2014 | Behrens ................ F03D 7/0232 |
| | | | 416/24 |
| 9,187,175 B1 | * | 11/2015 | Chen ....................... B64D 1/22 |
| 9,212,625 B2 | * | 12/2015 | Shelley .................. B64D 27/14 |
| 2002/0098087 A1 | | 7/2002 | Gmirya |
| 2003/0080243 A1 | | 5/2003 | Hoisignton et al. |
| 2010/0047068 A1 | | 2/2010 | Parry et al. |
| 2010/0206982 A1 | | 8/2010 | Moore et al. |
| 2010/0254812 A1 | * | 10/2010 | Reitz ....................... F03D 1/025 |
| | | | 416/1 |
| 2011/0155840 A1 | | 6/2011 | Lind et al. |
| 2011/0295526 A1 | | 12/2011 | Wall |
| 2012/0195739 A1 | | 8/2012 | Kingan |
| 2013/0156583 A1 | | 6/2013 | Wood |
| 2015/0078888 A1 | | 3/2015 | Golshany et al. |
| 2015/0210388 A1 | | 7/2015 | Criado et al. |
| 2015/0284071 A1 | | 10/2015 | Veilleux et al. |
| 2017/0217566 A1 | | 8/2017 | Ichinose |
| 2017/0274980 A1 | | 9/2017 | Dejeu et al. |
| 2017/0274982 A1 | | 9/2017 | Beckman et al. |
| 2017/0274994 A1 | | 9/2017 | Eller et al. |

FOREIGN PATENT DOCUMENTS

| | | |
|---|---|---|
| CN | 102317608 A | 1/2012 |
| CN | 103419919 A | 12/2013 |
| GB | 433989 A | 8/1935 |
| GB | 743955 A | 1/1956 |
| JP | 2015112929 A | 6/2015 |
| WO | 9001002 | 2/1990 |
| WO | 2010027801 A2 | 3/2010 |

\* cited by examiner

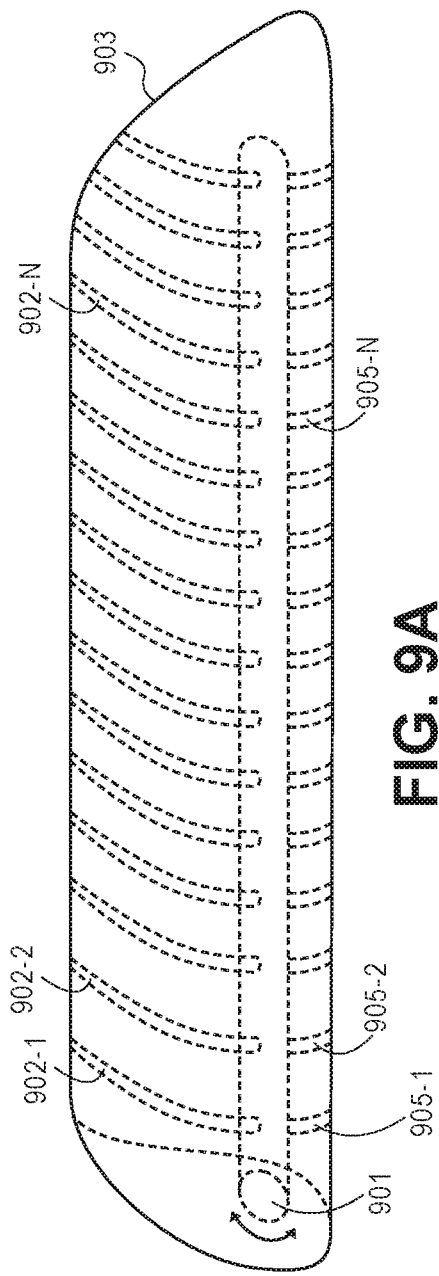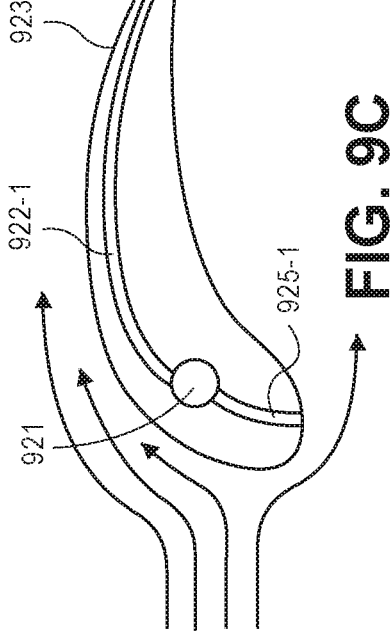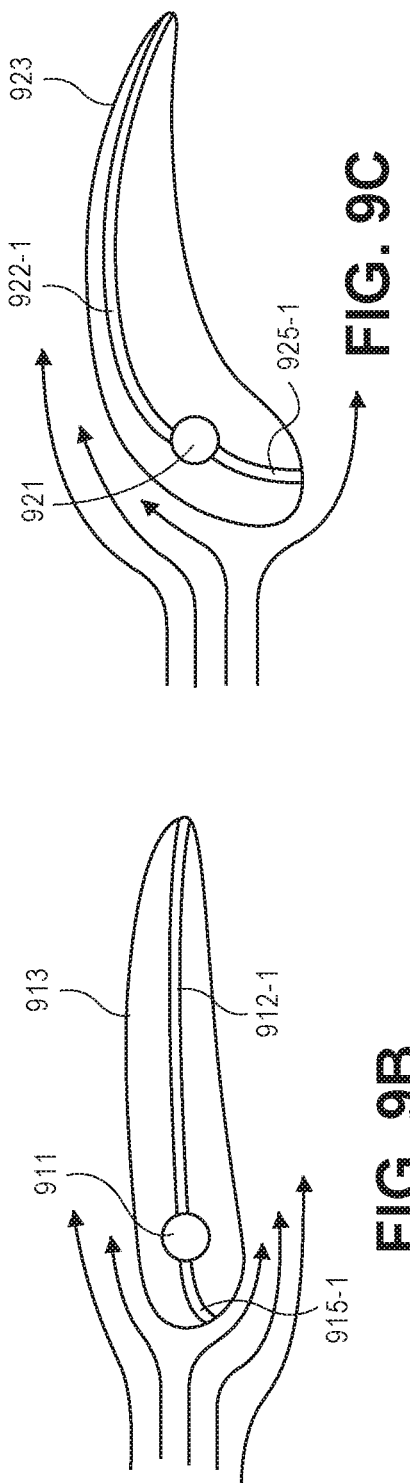

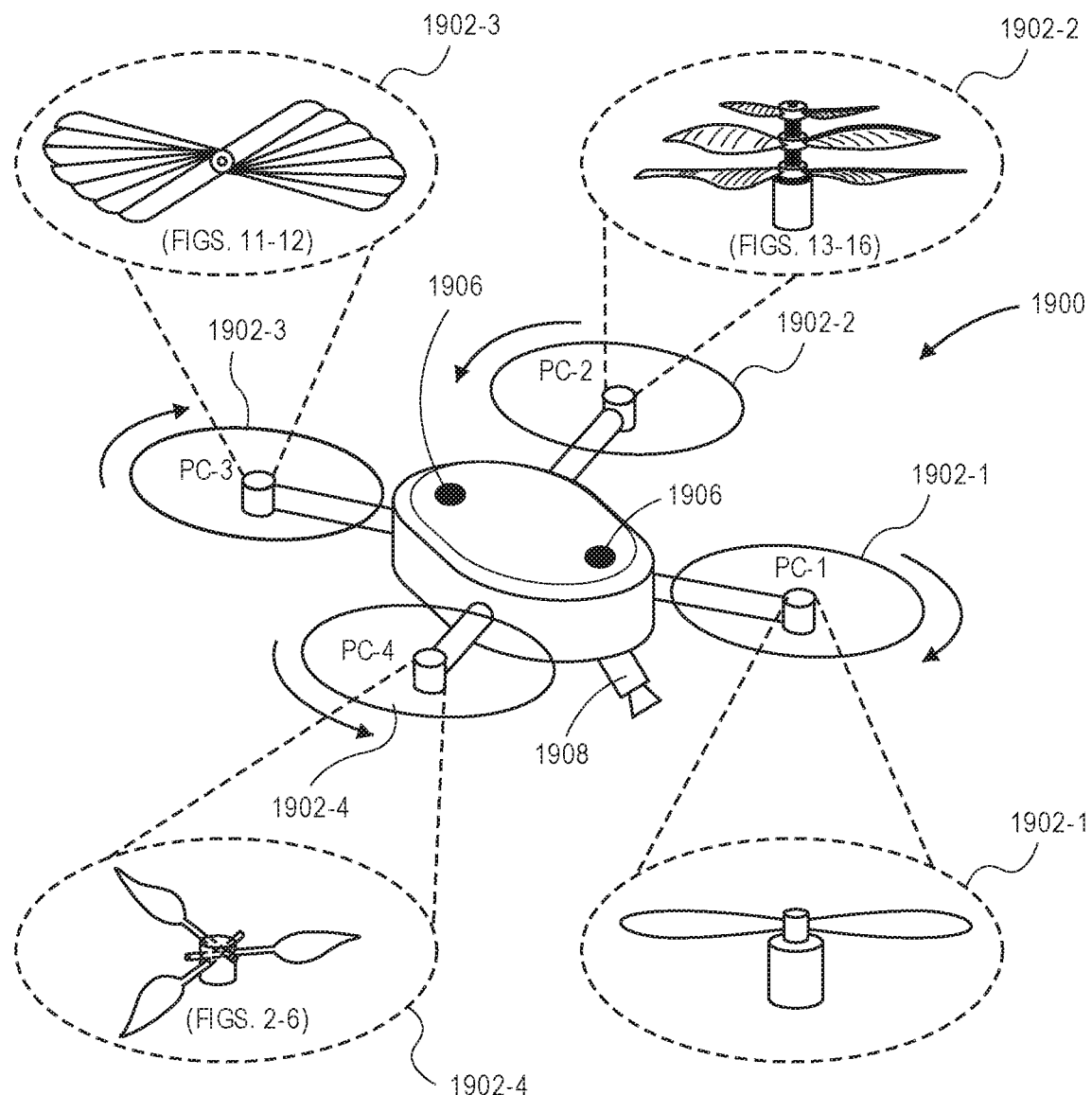
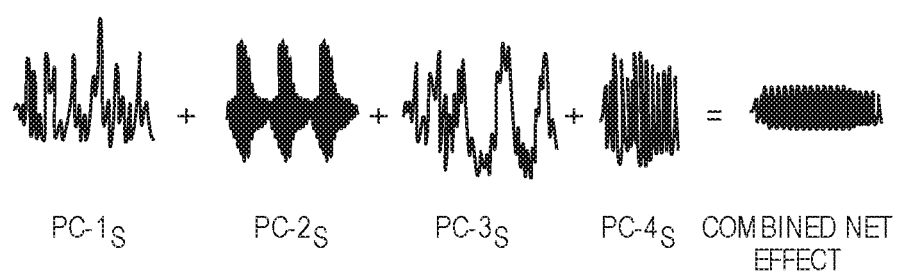
FIG. 19

AERIAL VEHICLE ADAPTABLE PROPELLER BLADES

CROSS-REFERENCE TO RELATED APPLICATION

This application is a Continuation-In-Part of U.S. patent application Ser. No. 15/078,899, filed Mar. 23, 2016, entitled "Coaxially Aligned Propellers Of An Aerial Vehicle," which is incorporated herein by reference in its entirety.

BACKGROUND

Sound is kinetic energy released by the vibration of molecules in a medium, such as air. In industrial applications, sound may be generated in any number of ways or in response to any number of events. For example, sound may be generated in response to vibrations resulting from impacts or frictional contact between two or more bodies. Sound may also be generated in response to vibrations resulting from the rotation of one or more bodies, such as propellers. Sound may be further generated in response to vibrations caused by fluid flow over one or more bodies. In essence, any movement of molecules, or contact between molecules, that causes a vibration may result in the emission of sound at a pressure level or intensity, and at one or more frequencies.

The use of unmanned aerial vehicles such as airplanes or helicopters having one or more propellers is increasingly common. Such vehicles may include fixed-wing aircraft, or rotary wing aircraft such as quad-copters (e.g., a helicopter having four rotatable propellers), octo-copters (e.g., a helicopter having eight rotatable propellers) or other vertical take-off and landing (or VTOL) aircraft having one or more propellers. Typically, each of the propellers is powered by one or more rotating motors or other prime movers.

With their ever-expanding prevalence and use in a growing number of applications, unmanned aerial vehicles frequently operate within a vicinity of humans or other animals. When an unmanned aerial vehicle is within a hearing distance, or earshot, of a human or other animal, sounds generated by the unmanned aerial vehicle during operation may be detected by the human or the other animal. Such sounds may include, but are not limited to, sounds generated by rotating propellers, operating motors or vibrating frames or structures of the unmanned aerial vehicle.

BRIEF DESCRIPTION OF THE DRAWINGS

FIGS. 9A-9C illustrate views of an adjustable propeller blade, according to an implementation.

FIG. 19 is a view of another view of an aerial vehicle, according to an implementation.

DETAILED DESCRIPTION

Figure 1:
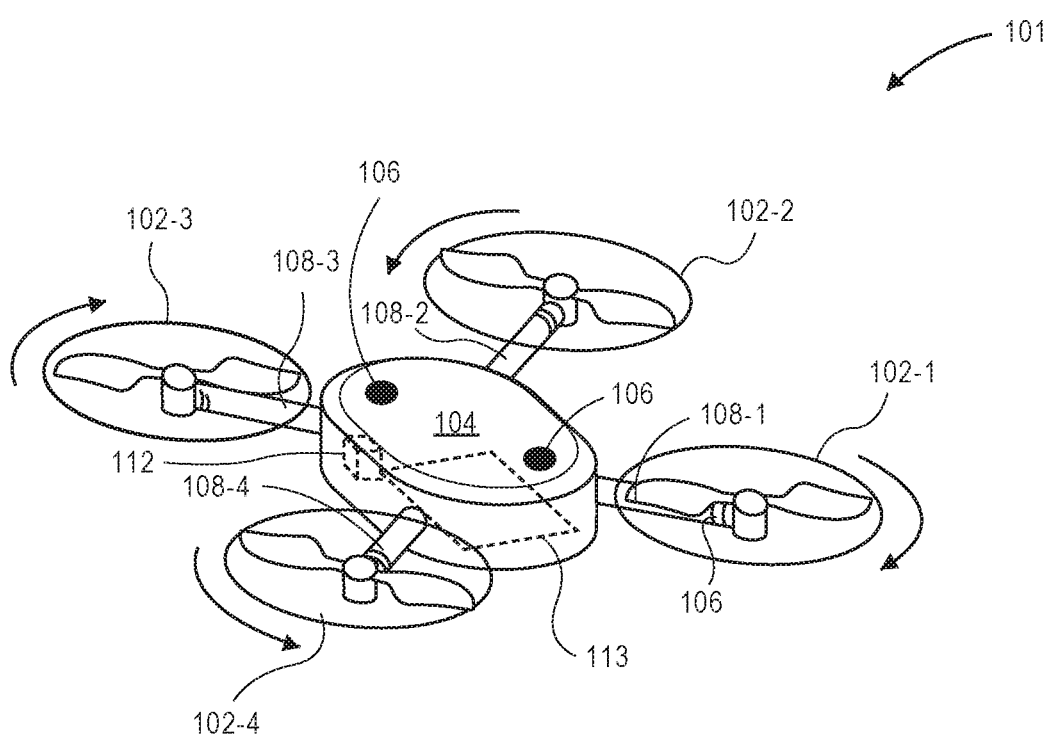
FIG. 1 is a view of an aerial vehicle, according to an implementation.

The present disclosure is directed to controlling, reducing, and/or altering sound generated by an aerial vehicle, such as an unmanned aerial vehicle ("UAV"), while the aerial vehicle is airborne. In some implementations, one or more of the propeller blades of a propeller may be adjustable, laterally and/or rotationally. For example, the propeller blades may be extendable away from a motor that is used to rotate the propeller blades and/or be retractable toward the motor. In such a configuration, the lifting or thrusting force generated by the propellers may be altered by adjusting the position of one or more of the propeller blades, without altering the revolutions per minute ("RPM") of the motor. Likewise, the sound generated by the rotation of the propeller will also be altered due to the different position of the propeller blades.

In other implementations, the size, shape, camber, chord length, line, thickness, pitch, etc., of one or more propeller blades of a propeller may be altered during flight. Such alterations will alter the lifting or thrusting force generated by the propeller blade and also alter the produced sound profile of the propeller blade.

In some implementations, propellers of the aerial vehicle are aligned coaxially along a motor shaft. The propeller blades may be configured to rotate in the same direction (co-rotation), are in rotational phase alignment, and may be separated a defined distance so that the high pressure pulse of the induced flow from the lower propeller is canceled out by the high pressure pulse of the induced flow from the upper propeller. In other implementations, the coaxially aligned propellers may have different lifting and/or sound producing properties. For example, one of the propellers may have larger propeller blades that generate a first lifting force and a first sound profile when rotated by the motor at a defined RPM. A second propeller of the coaxially aligned propellers may have a different configuration (e.g., different diameter, different chord length, different camber, different pitch, etc.) and generate a second lifting force and a second sound profile when rotated by the motor at the defined RPM. In such a configuration, the different propellers may be individually engaged by a propeller adjustment controller so that the different lifting force or different sound profile may be utilized at different segments of a flight of the aerial vehicle. The non-engaged propeller(s) may either be allowed to rotate freely or may be locked into a fixed position.

In other implementations, the distance between the propellers, alignment of the propellers, and/or propeller blade configurations (e.g., camber, pitch, cord length, diameter, etc.) may be altered to reduce the sound generated by the induced flow from the rotation of the propellers. For example, as the coaxially aligned propellers rotate, the sound generated by the high pressure pulse from the induced flows may be measured and one or more of the alignment of the propellers, the distance between the propellers, and/or one or more propeller blade configurations of one or more of the propeller blades may be altered to alter the sound generated by the rotation of the propellers.

In some implementations, not all of the propulsion mechanisms may include coaxially aligned and stacked propellers. Likewise, in some implementations, the distance between coaxially aligned and stacked propellers may be fixed, rather than adjustable. In such a configuration, the aerial vehicle may include two or more coaxially aligned and stacked propellers that will function primarily as a lifting propulsion mechanism and be configured to generate a force sufficient to lift the aerial vehicle and any engaged payload. In addition, the aerial vehicle may include one or more maneuverability propulsion mechanisms, such as propeller and motor pairs, that may be used to maneuver the aerial vehicle during flight. The lifting propulsion mechanism(s) and/or the maneuverability propulsion mechanism(s) may include coaxially aligned and stacked propellers, single propellers, or other forms of propulsion. Likewise, one or more propeller configurations and/or the position of the propeller blades may be adjustable, as discussed herein.

In some implementations, the coaxially aligned and stacked propellers may be adjustable. For example, it may be determined whether sound reduction is necessary. If sound reduction is not necessary, the position of the propellers may be adjusted so that they are approximately ninety degrees out of rotational phase alignment to one another. While such a position may result in more sound, the lift generated by the pair of propellers and/or the efficiency of the propulsion mechanism may be increased. However, if it is determined that sound reduction is desirable, the position of the propellers may be adjusted so that the propellers are phase aligned and the high pressure forces at least partially cancel out, thereby reducing the sound generated by the rotation of the propellers. Alternatively, one or more of the coaxially aligned and stacked propellers may be disengaged so that it is not rotating and generating additional sound. As another alternative, the position of one or more of the propeller blades may be altered so that the sound and/or lift generated by the propeller blade during rotation is modified.

In some implementations, one or more sensors may be positioned on the aerial vehicle that measure sound generated by or around the aerial vehicle. Based on the measured sound, the position of the one or more of the propeller blades and/or one or more propeller blade configurations may be altered to generate an anti-sound that, when combined with the sound generated by the aerial vehicle, alters the sound generated by the aerial vehicle. For example, a processor of the aerial vehicle may maintain information relating to the different sounds generated by different propeller blade positions and/or configurations. Based on the measured sound and the desired lifting force to be produced by the propeller, propeller blade positions and/or propeller blade configurations are selected that will result in the propeller generating an anti-sound as it rotates that will cause interference that cancels out, reduces, and/or otherwise alters the measured sound when the propeller is rotating at the desired rotational speed. Such interference may be a destructive interference or a constructive interference.

In some implementations, measured sounds may be recorded along with and/or independently of other operational and/or environmental data. Such information or data may include, but is not limited to, extrinsic information or data, e.g., information or data not directly relating to the aerial vehicle, or intrinsic information or data, e.g., information or data relating to the aerial vehicle itself. For example, extrinsic information or data may include, but is not limited to, environmental conditions (e.g., temperature, pressure, humidity, wind speed, and wind direction), times of day or days of a week, month or year when an aerial vehicle is operating, measures of cloud coverage, sunshine, surface conditions or textures (e.g., whether surfaces are wet, dry, covered with sand or snow or have any other texture) within a given environment, a phase of the moon, ocean tides, the direction of the earth's magnetic field, a pollution level in the air, a particulates count, or any other factors within the given environment. Intrinsic information or data may include, but is not limited to, operational characteristics (e.g., dynamic attributes such as altitudes, courses, speeds, rates of climb or descent, turn rates, or accelerations; or physical attributes such as dimensions of structures or frames, numbers of propellers or motors, operating speeds of such motors) or tracked positions (e.g., latitudes and/or longitudes) of the aerial vehicles. In accordance with the present disclosure, the amount, the type and the variety of information or data that may be captured and collected regarding the physical or operational environments in which aerial vehicles are operating and correlated with information or data regarding measured sounds is theoretically unbounded.

The extrinsic information or data and/or the intrinsic information or data captured by aerial vehicles during flight may be used to train a machine learning system to associate an aerial vehicle's operations or locations, or conditions in such locations, with sounds generated by the aerial vehicle. The trained machine learning system, or a sound model developed using such a trained machine learning system, may then be used to predict sounds that may be expected when an aerial vehicle operates in a predetermined location, or subject to a predetermined set of conditions, at given velocities or positions, or in accordance with any other characteristics. Once such sounds are predicted, propeller blade positions and/or propeller blade configurations that will result in the propellers generating anti-sounds are determined. An anti-sound, as used herein, refers to sounds having amplitudes and frequencies that are approximately but not exclusively opposite and/or approximately but not exclusively out-of-phase with the predicted or measured sounds (e.g., having polarities that are reversed with respect to polarities of the predicted sounds). During airborne operation of the aerial vehicle, the propeller blade positions and/or propeller blade configurations are altered so that the propellers will generate the anti-sound. When the anti-sounds are generated by the propeller blades, such anti-sounds effectively interfere with some or all of the predicted sounds at those locations. In this regard, the systems and methods described herein may be utilized to effectively control, reduce, and/or otherwise alter the sounds generated by aerial vehicles during flight.

In a similar manner, sound profiles for different propeller blade positions and/or different propeller blade configurations at different RPMs may be measured and a sound profile generated for different propeller blades. Likewise, an efficiency profile and/or maneuverability profile may be determined for different propellers based on the propeller blade positions and/or propeller blade configurations at the different RPMS. During operation of the aerial vehicle, different propeller blade positions and/or different propeller blade configurations may be determined and selected based on the desired operational profile of the aerial vehicle. For example, if the aerial vehicle is traveling at a high altitude between two locations, the operational profile of the aerial vehicle during that portion of the flight may be to optimize for efficiency, rather than sound or maneuverability. In such a configuration, propeller blades may be positioned and/or have propeller blade configurations adjusted so that the motors rotating those propeller blades are operating in their most efficient range, thereby reducing the amount of power required to aerially navigate the aerial vehicle.

In comparison, if the aerial vehicle is descending toward a delivery destination, the operational profile of the aerial vehicle during that portion of the flight may be to optimize for sound reduction and/or agility, rather than efficiency. In such a configuration, propeller blades may be positioned and/or have propeller blade configurations adjusted so that the sound produced by the rotation of the propeller blades is reduced or otherwise altered and/or so that the aerial vehicle is more agile and maneuverable. In such a configuration, the power consumed by the rotation of the motors may be increased.

While the examples discussed herein primarily focus on UAVs in the form of an aerial vehicle utilizing multiple propellers to achieve flight (e.g., a quad-copter, octo-copter), it will be appreciated that the implementations discussed herein may be used with other forms and/or configurations of aerial vehicles.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items (also referred to herein as a payload) may be delivered. For example, the delivery location may be a person's residence, a place of business, a location within a materials handling facility (e.g., packing station, inventory storage), or any location where a user or inventory is located, etc. Inventory or items may be any physical goods that can be transported using an aerial vehicle.

FIG. 1 is a view of a vertical takeoff and landing (VTOL) aerial vehicle 101, such as an unmanned aerial vehicle, according to an implementation. The aerial vehicle 101 includes four propulsion mechanisms 102-1, 102-2, 102-3, and 102-4 spaced about a body 104 of the aerial vehicle 101. In this example, the maneuverability propulsion mechanisms include a motor and one or more propellers. As discussed further below, one or more of the propulsion mechanisms may include multiple coaxially aligned and stacked propellers, and/or propeller blades of one or more propulsion mechanisms may be adjustable with respect to the motor, and/or the configuration of one or more of the propeller blades may be adjustable. An aerial vehicle control system, discussed below with respect to FIG. 20, which may be positioned within the body 104, is utilized for controlling the propeller motors for flying the aerial vehicle 101, as well as controlling other operations of the aerial vehicle 101. Each of the propeller motors may be rotated at different speeds, thereby generating different lifting forces by the different propulsion mechanisms.

The motors may be of any type and of a size sufficient to rotate the propellers 102 at speeds sufficient to generate enough lift to aerially propel the aerial vehicle 101 and any items engaged by the aerial vehicle 101 so that the aerial vehicle 101 can navigate through the air, for example, to deliver an item to a location. The outer body or surface area of each propeller 102 may be made of one or more suitable materials, such as graphite, carbon fiber, etc. While the example of FIG. 1 includes four propulsion mechanisms, in other implementations, more or fewer propulsion mechanisms may be utilized. Likewise, in some implementations, the propulsion mechanisms may be positioned at different locations and/or orientations on the aerial vehicle 101. Alternative methods of propulsion may also be utilized in addition to the propellers and propeller motors. For example, engines, fans, jets, turbojets, turbo fans, jet engines, and the like may be used in combination with the propellers and propeller motors to propel the aerial vehicle.

The body 104 or frame of the aerial vehicle 101 may be of any suitable material, such as graphite, carbon fiber, and/or aluminum. In this example, the body 104 of the aerial vehicle 101 includes four motor arms 108-1, 108-2, 108-3, and 108-4 that are coupled to and extend from the body 104 of the aerial vehicle 101. The propulsion mechanisms 102 are positioned at the ends of each motor arm 108. In some implementations, all of the motor arms 108 may be of approximately the same length while, in other implementations, some or all of the motor arms may be of different lengths. Likewise, the spacing between the two sets of motor arms may be approximately the same or different.

In some implementations, one or more sensors 106 configured to measure sound at the aerial vehicle are included on the aerial vehicle 101. The sensors 106 may be at any location on the aerial vehicle 101. For example, a sensor 106 may be positioned on each motor arm 108 and adjacent to the propulsion mechanism 102 so that different sensors can measure different sounds generated at or near the different propulsion mechanisms 102. In another example, one or more sensors may be positioned on the body 104 of the aerial vehicle 101. The sensors 106 may be any type of sensors capable of measuring sound and/or sound waves. For example, the sensor may be a microphone, transducer, piezoelectric sensor, an electromagnetic pickup, an accelerometer, an electro-optical sensor, an inertial sensor, etc.

In some implementations, some or all of the propulsion mechanisms may include propeller adjustment controllers. Likewise, some or all of the propeller adjustment controllers may be affixed to the propulsion mechanisms. Alternatively, some or all of the propeller adjustment controllers may be moveable or otherwise adjusted during operation of the aerial vehicle and rotation of the propeller blade.

In some implementations, by measuring sounds at or near each propulsion mechanism 102 and altering the position, rotation, and/or configuration of one or more propeller blades of the propulsion mechanism 102 to alter the generated sound, the measured sounds and anti-sounds at each propulsion mechanism are independent. Accordingly, each sensor and propulsion mechanism may operate independent of other sensors and propulsion mechanisms on the aerial vehicle and each may include its own processing and/or memory for operation. For example, the processor may receive a commanded lifting force and determine propeller blade positions, propeller blade configurations and motor RPMs that will produce the lifting force and a desired sound profile. Alternatively, one or more sensors 106 positioned on the body 104 of the aerial vehicle may measure generated sounds and a propeller adjustment controller may send instructions to different propulsion mechanisms to cause the positions and/or configurations of different propeller blades to be altered, thereby generating different lifting forces and/or sounds.

Likewise, the aerial vehicle 101 includes one or more power modules 112. The power module 112 for the aerial vehicle may be in the form of battery power, solar power, gas power, super capacitor, fuel cell, alternative power generation source, or a combination thereof. The power module(s) 112 are coupled to and provide power for the aerial vehicle control system, the propulsion mechanisms, and the payload engagement mechanism. In some implementations, one or more of the power modules may be configured such that it can be autonomously removed and/or replaced with another power module. For example, when the aerial vehicle lands at a delivery location, relay location and/or materials handling facility, the aerial vehicle may engage with a charging member at the location that will recharge and/or replace the power module.

As mentioned above, the aerial vehicle 101 may also include a payload engagement mechanism 113. The payload engagement mechanism 113 may be configured to engage and disengage items and/or containers that hold items. In this example, the payload engagement mechanism 113 is positioned beneath the body of the aerial vehicle 101. The payload engagement mechanism may be of any size sufficient to securely engage and disengage containers that contain items. In other implementations, the payload engagement mechanism may operate as the container, containing the item(s). The payload engagement mechanism 113 communicates with (via wired or wireless communication) and is controlled by the aerial vehicle control system. The aerial vehicle control system is discussed in further detail below with respect to FIG. 20.

While the implementations of the aerial vehicle discussed herein utilize propellers to achieve and maintain flight, in other implementations, the aerial vehicle may be configured in other manners. For example, the aerial vehicle may be a combination of both propellers and fixed wings. In such configurations, the aerial vehicle may utilize one or more propellers to enable takeoff, landing, and anti-sound generation and a fixed wing configuration or a combination wing and propeller configuration to sustain flight while the aerial vehicle is airborne. In some implementations, one or more of the propulsion mechanisms (e.g., propellers and motors) may have a variable axis such that it can rotate between vertical and horizontal orientations.

Figure 2:
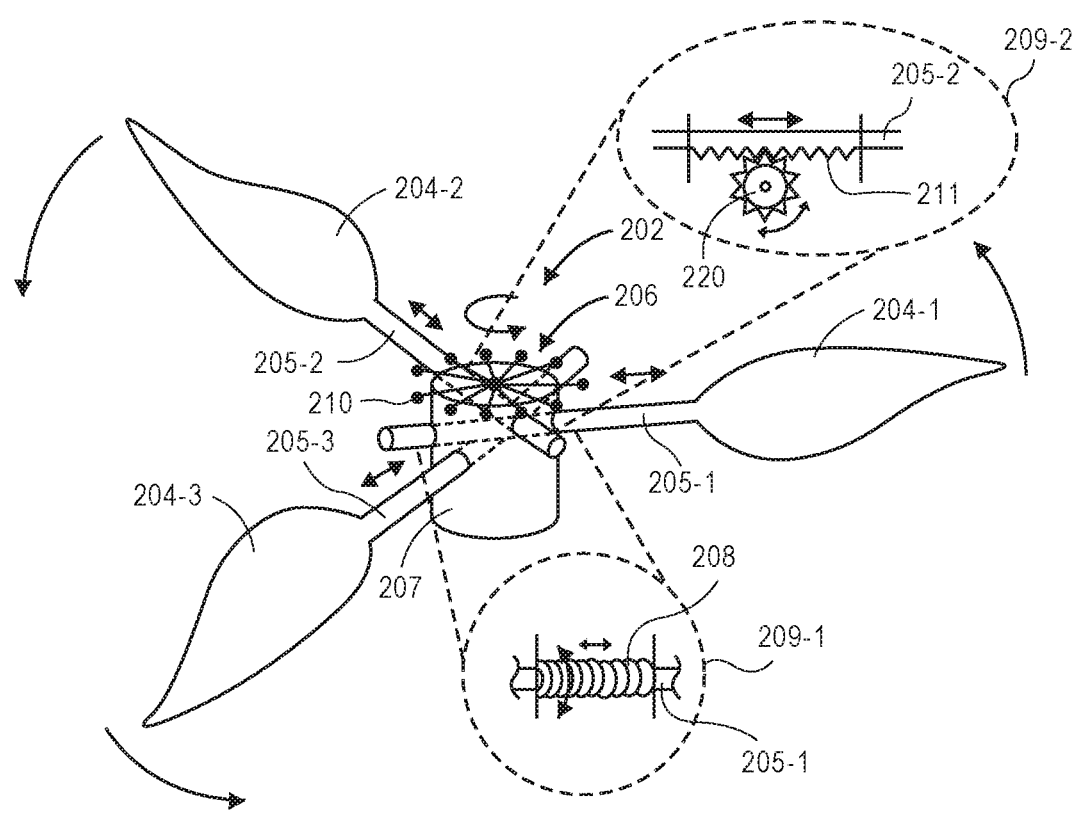
FIG. 2 is a view of a propulsion mechanism with telescoping propeller blades, according to an implementation.

FIG. 2 is a view of a propulsion mechanism 202 with telescoping propeller blades 204, according to an implementation. In the illustrated example, the propulsion mechanism includes a motor 206 and three telescoping propeller blades 204. In other implementations, the propulsion mechanism may include fewer or additional telescoping propeller blades. The motor may be any type of motor that may rotate and cause the propeller blades 204 to rotate, thereby generating a lifting force. For example, the motor 206 may be a direct current brushless motor.

Rather than having a single shaft coupled to and rotated by the motor, the housing 207 of the motor may be rotated by the motor. In such a configuration, a shaft 205 of the telescoping propeller blades 204 extend through the housing and are configured to be extendable or retractable with respect to the housing. As illustrated, each propeller blade includes a shaft 205-1, 205-2, 205-3 having a proximal end and a distal end. The proximal end of each shaft extends through the housing 207 of the motor and the propeller blade 204-1, 204-2, 204-3 of the propeller is coupled to the distal end of the shaft and extends away from the shaft. The propeller blades generate lifting forces when rotated by the motor.

While FIG. 2 illustrates a solid shaft that extends or retracts with respect to the housing 207, in other implementations, the shaft may be a telescoping shaft that is coupled to the housing at a fixed end. In such a configuration, the opposing end of the shaft may be extended, retracted and/or rotated thereby moving the propeller blade coupled to the opposing end inward, outward, or rotationally with respect to the motor.

The propulsion mechanism also includes a propeller adjustment controller 208 configured to extend and/or retract each of the propeller blades 204 by moving the shaft in or out with respect to the motor housing 207. The propeller adjustment controller may have multiple different configurations and, in some implementations, each propeller blade may be controlled by a separate propeller adjustment controller. In other implementations, each propeller blade of the propulsion mechanism may be controlled by a single propeller adjustment controller.

Figure 3:
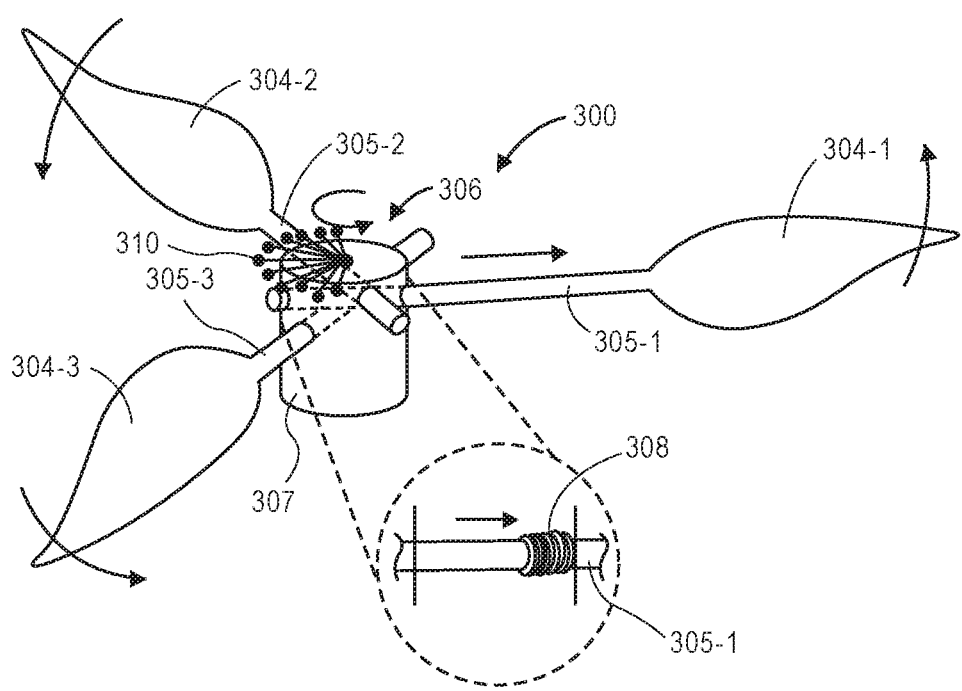
FIG. 3 is another view of a propulsion mechanism with telescoping propeller blades, according to an implementation.

In one implementation, as illustrated in the expanded view 209-1 of FIG. 2, the propeller adjustment controller may include a spring that is coupled to and extends around the shaft 205 and positioned within an interior of the housing 207 of the motor. As the RPM of the motor increases and, thus, the centrifugal force acting upon the propeller blade increases, the spring compresses 308 (FIG. 3) between the connection point with the shaft and the inner wall of the housing 307, thereby allowing the propeller blade to extend away from the housing 307 of the motor 306, as illustrated in FIG. 3. In comparison, as the RPM of the motor decreases and, thus, the centrifugal force acting upon the propeller blade decreases, the spring decompresses thereby retracting the propeller blade 204 toward the housing 207 of the motor 206.

In other implementations, rather than or in addition to using a spring, the propeller adjustment controller may include a series of gears and/or actuators that may be used to mechanically extend and/or retract the propeller blade. For example, referring to the expanded view 209-2, a portion of the shaft may include a series of gears or grooves 211 that mate with a gear 212. The gear 212 may be controlled by the propeller adjustment controller and, when rotated in a first direction, the gear 212 will cause the propeller blade to extend away from the housing 207 of the motor 206. When the gear 212 is rotated in the second direction, the gear 212 will cause the propeller blade to retract toward the housing of the motor.

In still other implementations, the propeller adjustment controller may utilize other mechanisms, alone or in combination with springs and/or gears to extend, retract, or otherwise alter a position of the propeller blades 204 of the propulsion mechanism. For example, pistons, hydraulics, pneumatics, etc., may be included in the propeller adjustment controller to alter a position of one or more of the propeller blades 204 of the propulsion mechanism 202.

The propeller adjustment controller may also be configured to rotate the shaft so that a pitch or angle of attack of the propeller blade 204 is altered, thereby altering the lift generated by the propeller blade. For example, if the propeller adjustment controller rotates the shaft in a first direction (e.g., clockwise), the pitch and/or angle of attack of the propeller blade increases, increasing the lift. If the propeller adjustment controller rotates the shaft in a second direction (e.g., counter-clockwise), the pitch and/or angle of attack of the propeller blade 204 decreases, decreasing the lift.

As the propulsion mechanism 202 rotates, the propeller blades generate a lifting force that is used to aerially navigate the aerial vehicle. In addition to generating lift, the propulsion mechanism 202 also generates sound, referred to herein as a sound profile. For example, when the propeller blades are in a first position and the motor is rotating at a first RPM, a first sound profile is generated as a result of the airflow around the rotating propeller blades. As discussed below, this sound profile may be measured and maintained in a data store by the aerial vehicle control system.

By enabling alteration of the position of the propeller blades and/or the pitch or angle of attack of the propeller blades, different sound profiles and/or different lifting forces can be generated at the same RPM of the motor. For example, if the propeller blades are all fully extended, the lifting force generated by the propulsion mechanism 202, even at the same RPM, will increase because the velocity of the propeller blades will increase. Likewise, the generated sound profile will be altered because of the change in the airflow around the propeller blades. In comparison, if the propeller blades are retracted toward the housing 207 of the motor 206 and the RPM of the motor 206 remains constant, the velocity of the propeller blades will decrease, thereby decreasing the lifting force and again altering the sound profile of the propulsion mechanism.

The propulsion mechanism may also include a series of positionable counterweights 210 that may be adjusted based on the position of one or more of the propellers. For example, if all the propellers are extended a same amount and have a similar weight, the counterweights may be distributed equally around the motor 206 of the propulsion mechanism, as illustrated in FIG. 2. However, if one of the propellers is extended away from the motor 206 a distance greater than the distance of one or more other propellers and/or if one of the propeller blades has a higher weight than other propeller blades, the positionable counterweights may be shifted about the propulsion mechanism and/or extended from the propulsion mechanism, as illustrated in FIG. 3, so that the center of mass of the propulsion mechanism remains balanced. In some implementations, the position of the counterweights 210 may be known and correspond to respective positions of the propellers. Likewise, in some implementations, one or more sensors may be included in the propulsion mechanism that measure the vibrations and/or moments acting on the propulsion mechanism 202 and the position of the counterweights 210 may be adjusted based at least in part on the measurements.

As will be appreciated, for each defined RPM of the motor 206, any number of positions of the propeller blades, pitches of the propeller blades, and counter weight positions may be utilized. As such, any number of lifting forces and sound profiles may be realized with the implementations discussed herein. A table that includes the RPM of the motor, a position of each propeller blade, a lifting force of the propulsion mechanism and a generated sound profile may be maintained by the aerial vehicle control system and used to select a propeller blade configuration and RPM for the motor in response to a commanded lifting force. A portion of an example table is illustrated below as Table 1:

TABLE 1

| RPM | Propeller Blade 1 Position | Propeller Blade 2 Position | Propeller Blade 3 Position | Lifting Force (Newton) | Sound Profile (Decibels) |
| --- | --- | --- | --- | --- | --- |
| 2,300 RPM | 1 | 1 | 1 | 190 N | 70 dB |
| 2,300 RPM | 3 | 2 | 2 | 195 N | 75 dB |
| 2,300 RPM | 5 | 3 | 3 | 202 N | 80 dB |
| 2,300 RPM | 5 | 5 | 5 | 230 N | 85 dB |

In the example portion of illustrated Table 1, the RPM of the motor is held constant and the propeller blades are moved to different positions, thereby generating different lifting forces and sound profiles. In this example, the different positions of the propeller blades range between fully retracted toward the housing of the motor, represented as position 1, to fully extended from the housing of the motor, represented as position 5. As will be appreciated, any number of positions between a fully retracted position and a fully extended position may be utilized and the positions 1-5 are provided for example and discussion purposes only. In addition to positions, the table may also identify different configurations for each propeller blade (e.g., pitch, camber, angle of attack, chord length) and/or different counterweight positions.

The propeller blades of the propulsion mechanism may be moved between positions and one or more of the propeller blades may be in a different position than the other propeller blades and/or have different configurations than other propeller blades of the propulsion mechanism. In such a configuration, to maintain balance of the propulsion mechanism, the weight distribution of the propeller blades needs to remain centered and the center of lift needs to remain centered. Accordingly, based on the position of the propeller blades, one or more of a configurations of the propeller blades may be altered, thereby altering the lift. Likewise, a position of one or more of the counterweights 210 may be altered, thereby altering the weight distributions around the propulsion mechanism.

FIG. 3 illustrates the propulsion mechanism 300 in which the first propeller blade has been fully extended such that the shaft 305-1 is moved outward from the housing 307 of the motor and the propeller blade 304-1 is extended away from the housing 307 of the motor. Referring to Table 1 above, the first propeller is in the fifth position. To balance the propulsion mechanism 300 and generate the desired lift and sound profile, the other two propeller blades are partially extended to position three. For example, the propeller blade 304-2 and the propeller blade 304-3 are each partially extended from the housing of the motor 306. Likewise, the counterweights 310 are rotated to be on the opposite side of the housing 307 so that the overall weight remains centered in the propulsion mechanism. Likewise, as illustrated, some of the counterweights 310 have been extended away from the housing 307 of the motor 306. In addition, the pitch of the propeller blade 304-1 may be decreased, thereby reducing the lift generated by the propeller blade and/or the pitch of propeller blades 304-2 and 304-3 may be increased, thereby increasing the lift generated by those propeller blades. By decreasing the lift generated by propeller blade 304-1 and/or increasing the lift generated by 304-2 and 304-3, the total lifting force generated by the propulsion mechanism remains centered about the propulsion mechanism.

In propulsion mechanisms in which the distance at which the propeller blades are extended are not all the same, the sound profile may be altered. For example, blade vortex interaction ("BVI"), which is sound generated when a propeller blade passes close to trailing tip vortices previously generated by another propeller blade of the propulsion mechanism, may be reduced. This reduction may occur, for example, because a propeller blade that is retracted may not pass through the vortices shed from the tip of a propeller that is extended a further distance. Likewise, because the blade tip velocity and/or pitch (or other characteristics) of the propeller blades may vary at the different extensions, the sound profile generated by the propeller blades may be different, even when rotating at the same RPM. As such, a sound generated by a first propeller of the propulsion mechanism may cause interference with a sound generated by a second propeller of the propulsion mechanism.

Figure 4:
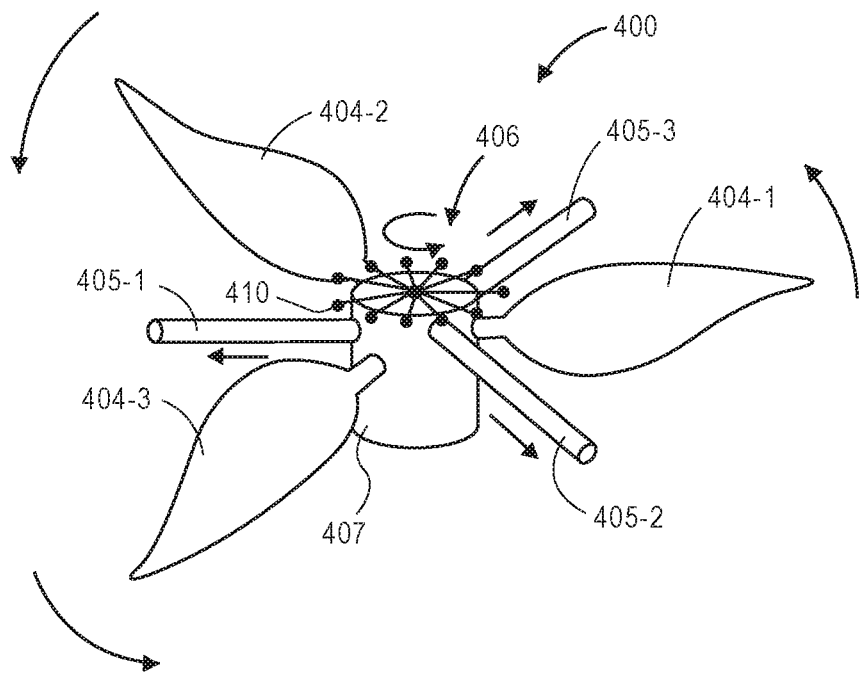
FIG. 4 is another view of a propulsion mechanism with telescoping propeller blades, according to an implementation.

FIG. 4 is another view of a propulsion mechanism 400 with telescoping propeller blades, according to an implementation. In this example, the propeller blades are fully retracted toward the housing 407 of the motor 406 and the counterweights 410 are evenly distributed about the housing 407. Referring to Table 1 above, the position illustrated in FIG. 4 corresponds to each of the propeller blades being at position 1. Because each of the propeller blades 404-1, 404-2, and 404-3 are extended a same length from the housing 307 of the motor 306, the propulsion mechanism is in balance, generates a lifting force, and a sound profile that is known for this position of the propeller blades. As shown, when the propeller blades are retracted, the propeller blades 404-1, 404-2, and 404-3 are retracted toward the housing 407 of the motor. Likewise, the shaft 405-1, 405-2, and 405-3 of each propeller is retracted back and extending out an opposing side of the housing of the motor 406.

Figure 5:
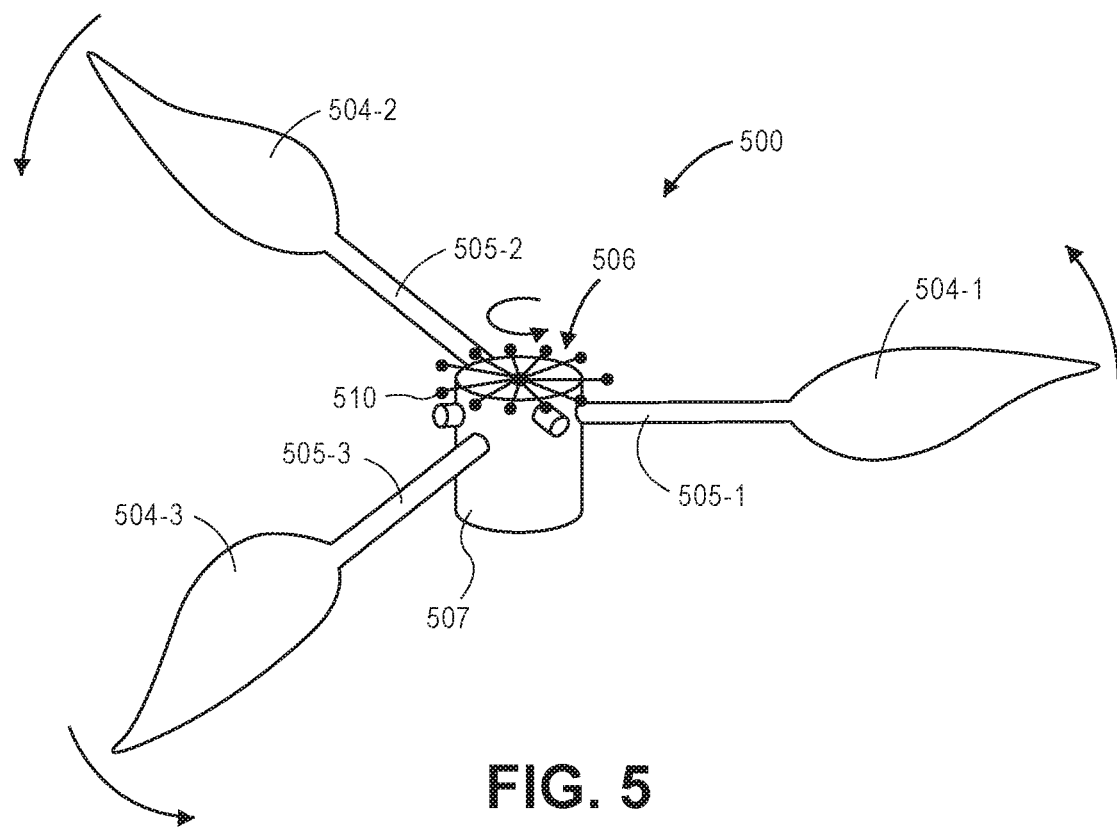
FIG. 5 is another view of a propulsion mechanism with telescoping propeller blades, according to an implementation.

FIG. 5 is another view of a propulsion mechanism 500 with telescoping propeller blades, according to an implementation. In this example, all three of the propeller blades 504-1, 504-2, and 504-3 are fully extended from the housing 507 of the motor 506 and the counterweights 510 are evenly distributed about the housing 507. Referring to Table 1 above, the position illustrated in FIG. 5 would correspond to each of the propeller blades being at position 5. Because each of the propeller blades are extended a same length from the housing 507 of the motor 506, the propulsion mechanism is in balance, generates a lifting force and a sound profile that is known for this position of the propeller blades. As shown, when the propeller blades are fully extended, the propeller blades 504-1, 504-2, and 504-3 are extended away from the housing 507 of the motor 506. Likewise, the shaft 505-1, 505-2, and 505-3 of each propeller is extended and near the opposing side of the housing 507 of the motor.

Figure 6:
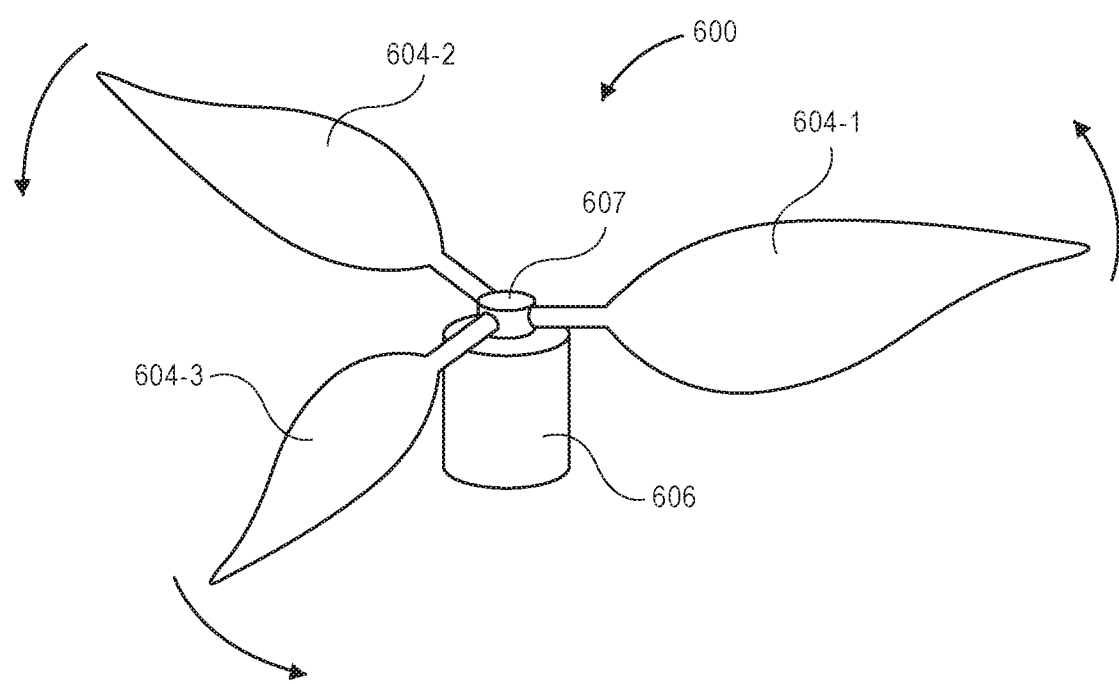
FIG. 6 is a view of a propulsion mechanism with different dimension propeller blades, according to an implementation.

FIG. 6 is a view of a propulsion mechanism 600 with different propeller blades coupled to a hub 607, according to an implementation. As with typical propulsion mechanism configurations, the hub 607 of the propeller is coupled to and rotated by a motor 606. However, in this implementation, rather than each propeller blade of the propeller having a uniform configuration, the different propeller blades 604-1, 604-2, and 604-3 have different configurations. For example, the different propeller blades may have one or more of a different size, shape, length, pitch, camber, chord length, weight, etc.

In configurations in which the propeller blades are different, to keep the propulsion mechanism in balance during operation the center of gravity of the propulsion mechanism 600 and the center of lift of the propulsion mechanism need to remain centered with respect to a rotational center of the propulsion mechanism. In this example, the rotational center of the propulsion mechanism is a center of the motor 606 about which the hub 607 is connected. To maintain the center of gravity at the center of the motor 606, the weight distribution of the propeller blades 604 is approximately equal. For example, the largest propeller blade may be formed of a first material, the mid-sized propeller blade 604-2 may be formed of a second material, the smallest propeller blade 604-3 may be formed of a third material, each of the materials having different weights so that the total weight distribution and center of gravity remains centered about the motor 606. In other implementations, the propeller blades may all be formed of the same material, but have different thicknesses, weight distributions along the length of the propeller blades, etc., so that the center of gravity remains centered about the motor 606. In still other examples, in a manner similar to that discussed above with respect to FIGS. 2-5, one or more counterweights may be included in the propulsion mechanism 600 to counterbalance one or more of the propeller blades 604 so that the weight distribution remains balanced and the center of gravity remains centered at the motor 606.

In addition to balancing the weight distribution of the different sized propeller blades, the individual lifting forces of each propeller blade 604 is configured to be approximately equal at a same RPM so that the center of lift is at approximately the center of the motor 606. To balance the individual lifting forces of the different propeller blades 604, each of which are rotated at the same RPM by the motor, the pitch, angle of attack, camber, chord line, thickness, etc. may be different for each propeller blade so that the individual lifting forces generated by each of the propeller blades 604 results in the center of lift being centered with respect to the motor 606. For example, the largest propeller blade 604-1 may have the lowest pitch and the smallest propeller blade 604-3 may have the highest pitch so that the respective lifting forces are balanced.

Similar to the discussion above with respect to FIG. 3, with different propeller blades, different sound profiles may be generated and the sound generated from BVI may be reduced because some of the propeller blades may not pass through vortices shed from the tips of other propeller blades of the propeller. For example, propeller blade 604-3, which is the smallest propeller blade of the propulsion mechanism 600, may not pass through the vortices shed from the tip of the largest propeller blade 604-1 due to the difference in length of the propeller blades. Likewise, in some implementations, the propeller blade configurations of each of the propeller blades 604-1, 604-2, and 604-3 may be optimized to generate respective sound profiles at a defined RPM so that the respective sound profiles will cause interference with each other thereby altering the net effect sound generated by the propulsion mechanism.

As will be appreciated, while the example discussed above with respect to FIG. 6 illustrates three propeller blades of a propulsion mechanism, in other implementations there may be fewer or additional propeller blades of the propulsion mechanism. Likewise, some of the propeller blades may have the same configuration. Moreover, in some implementations, the configuration of the propeller blades may be adjustable as discussed above with respect to FIGS. 2-5. For example, returning briefly to FIG. 2, one or more of the propeller blades 204-1, 204-2, or 204-3 may have a different configuration than other propeller blades of the propulsion mechanism.

In some implementations, as an alternative to or in addition to altering the position of a propeller blade and/or altering an angle of attack or pitch of the propeller blade by rotating the shaft of the propeller blade, as discussed above, the physical characteristics (e.g., shape, thickness, camber, chord length, etc.) may be altered during operation of the aerial vehicle. Such alterations may further change the lifting force generated by the propeller blade, the efficiency of the propeller blade, and/or the sound profile of the propeller blade.

Figure 7:
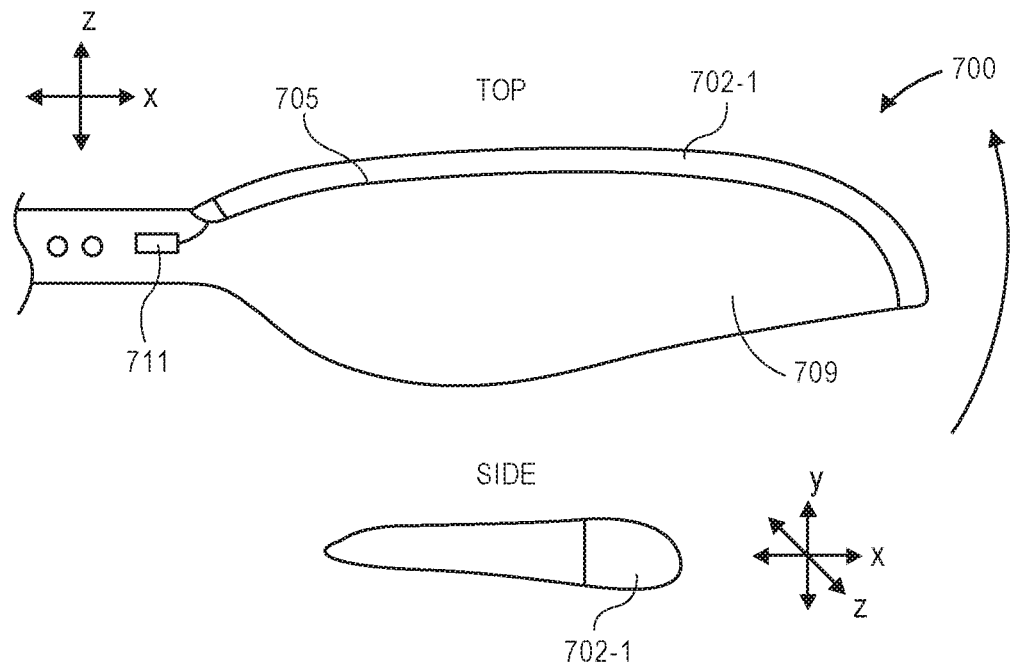
FIG. 7 is a top-down and side-view of a propeller blade with propeller blade treatments, according to an implementation.

For example, FIG. 7 is a top-view and a side-view of a propeller blade 700 that includes a propeller blade treatment 702-1, according to an implementation. In this example, the propeller blade treatment 702-1 is an inflatable bladder that extends along the leading edge 705 of the propeller blade. When the propeller blade treatment 702-1 is in a first position, it is deflated and retracted against the leading edge 705 of the propeller blade such that it is substantially in line with the propeller blade, as illustrated in FIG. 7.

Figure 8:
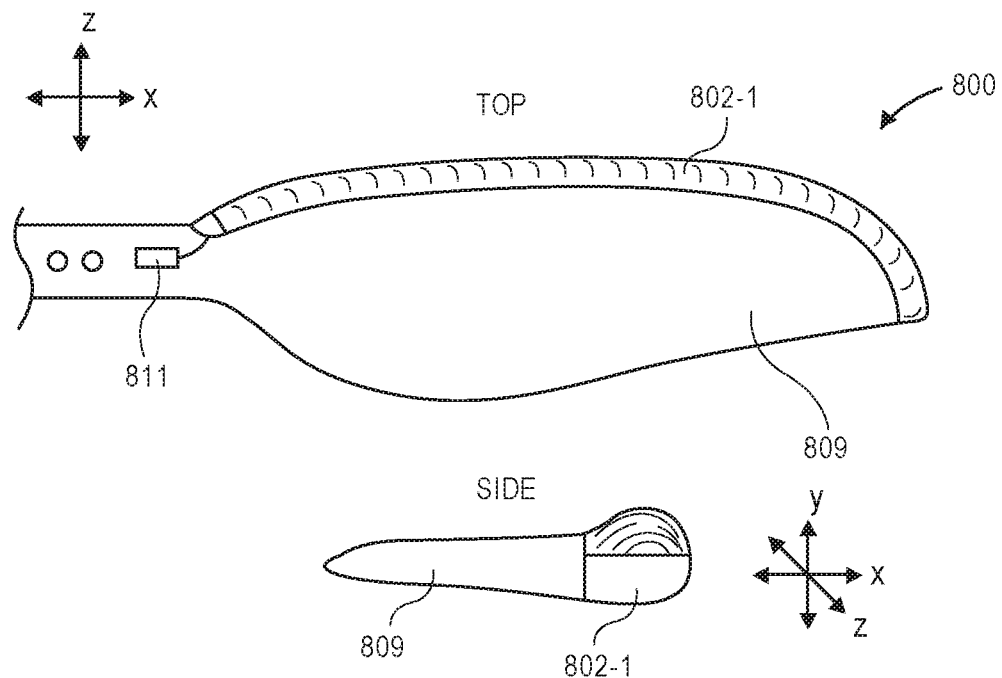
FIG. 8 is a top-down and side-view of a propeller blade with propeller blade treatments, according to an implementation.

To alter the position of the propeller blade treatment 702 from the first position, illustrated in FIG. 7, to a second position, illustrated in FIG. 8, the propeller adjustment controller 711 causes the propeller blade treatment 702-1 to inflate. When the propeller blade treatment inflates, it expands in a direction that includes a vertical and/or horizontal component with respect to the surface area 709 of the propeller blade 700. For example, as illustrated in the side view of FIG. 8, the propeller blade treatment 802-1 expands out of the plane of the surface area 809 of the propeller blade 800. This altered shape of the propeller blade disrupts the airflow as it passes over the propeller blade, thereby changing the sound generated by the propeller blade, the lifting force generated by the propeller blade and/or the efficiency of the propeller blade.

The propeller blade treatment 702, 802 illustrated in FIGS. 7-8 may be of any type of expandable or flexible material. Likewise, while this example illustrates the propeller blade treatment 702 extending along the leading edge, in other implementations, the propeller blade treatment 702 may be at other positions and/or orientations along the propeller blade. For example, the propeller blade treatment 702 may extend and cover the top surface area of the propeller blade. In such an example, when the propeller blade treatment is inflated, the thickness of the propeller blade increases, and the camber of the propeller blade changes.

When the propeller blade treatment is moved between a first position and a second position, even at the same RPM, the propeller will generate different sounds when the propeller blade treatment is at the different positions. In this example, the propeller blade may be capable of generating multiple different sounds and lifting forces as it rotates, depending on the amount of inflation of the propeller blade treatment 702-1. For example, the propeller blade 700 may generate a first sound and a first lifting force when rotating at a defined RPM and the propeller blade treatment 702-1 is in a first position (e.g., not inflated), generate a second sound and second lifting force when rotating at the same RPM and the propeller blade treatment 702-1 is in a second position (e.g., 50% inflated), and generate a third sound and third lifting force when the propeller is rotating at the same RPM and the propeller blade treatment 702-1 is in a third position (e.g., 100% inflated). By varying the amount of inflation, and thus the shape of the propeller blade, different sounds and/or lifting forces may be generated by the propeller blade 700 as the propeller rotates.

In some implementations, as illustrated in FIGS. 9A-9C, the airfoil shape, camber, and/or chord length of the propeller blades of a propeller may be dynamically adjustable, according to an implementation. For example, the propeller blade 903 may be substantially hollow, e.g., with a solid skin defining an airfoil having a hollow cavity therein, with one or more internal supports 901, 902, 905 or structural features for maintaining and/or altering the shape of the airfoil. For example, the propeller blade 903 or portions thereof may be formed from durable frames of stainless steel, carbon fibers, or other similarly lightweight, rigid materials and reinforced with radially aligned fiber tubes or struts. Utilizing a propeller blade 903 having a substantially hollow cross-section thereby reduces the mass of the lifting propeller and enables wiring, cables and other conductors or connectors to be passed there through, and in communication with one or more other control systems components or features. Likewise, the support arms, such as the spine 901, trailing edge ribs 902, and/or leading edge ribs 905 may be adjustable to thereby alter a shape of the airfoil. For example, referring to FIG. 9B, which illustrates a cross-sectional view of the spine 901 of FIG. 9A, when the spine 911 is in a first position, leading edge ribs 915-1, and trailing edge ribs 912-1 are in a first position and the airfoil shape of the propeller blade 913, which is a cross-sectional view of the blade 903 (FIG. 9A), has a first shape. If the airfoil shape of the blade is to be altered, the spine 901 may be rotated, as illustrated in FIG. 9C. In this example, the spine 921, which is a cross-sectional view of the spine 901 (FIG. 9A), is rotated, which causes the leading edge rib 925-1 and trailing edge rib 922-1 to bend or curve due to the forces acting on the support arms from the external solid skin of the propeller blade 923. As the ribs 922-1, 925-1 bend or curve, the airfoil shape of the propeller blade 923, which is a cross-section view of the blade 903, also changes. Specifically, the camber and chord length of the propeller blade is altered.

Returning to FIG. 9A, depending on the quantity, shape and/or position of the ribs 902 and 905, and the couple points between the leading edge ribs 905 and/or trailing edge ribs 902 with the spine 901, the airfoil shape of the blade 903 may be different at different sections of the propeller blade. As illustrated, any number of trailing edge ribs 902-1, 902-2-902-N may be included in the propeller blade 903 and define the airfoil shape of a portion of the propeller blade 903 depending on the curvature of the trailing edge ribs 902 and the position along the spine 901 to which they are coupled. Likewise, as illustrated, any number of leading edge ribs 905-1, 905-2-905-N may be included in the propeller blade 903 and define the airfoil shape of a portion of the propeller blade 903 depending on the curvature of the leading edge ribs 905 and the position of the spine 901 to which they are coupled. The quantity, size, shape, position, etc., may vary between trailing edge ribs 902 and/or leading edge ribs 905.

Figure 10:
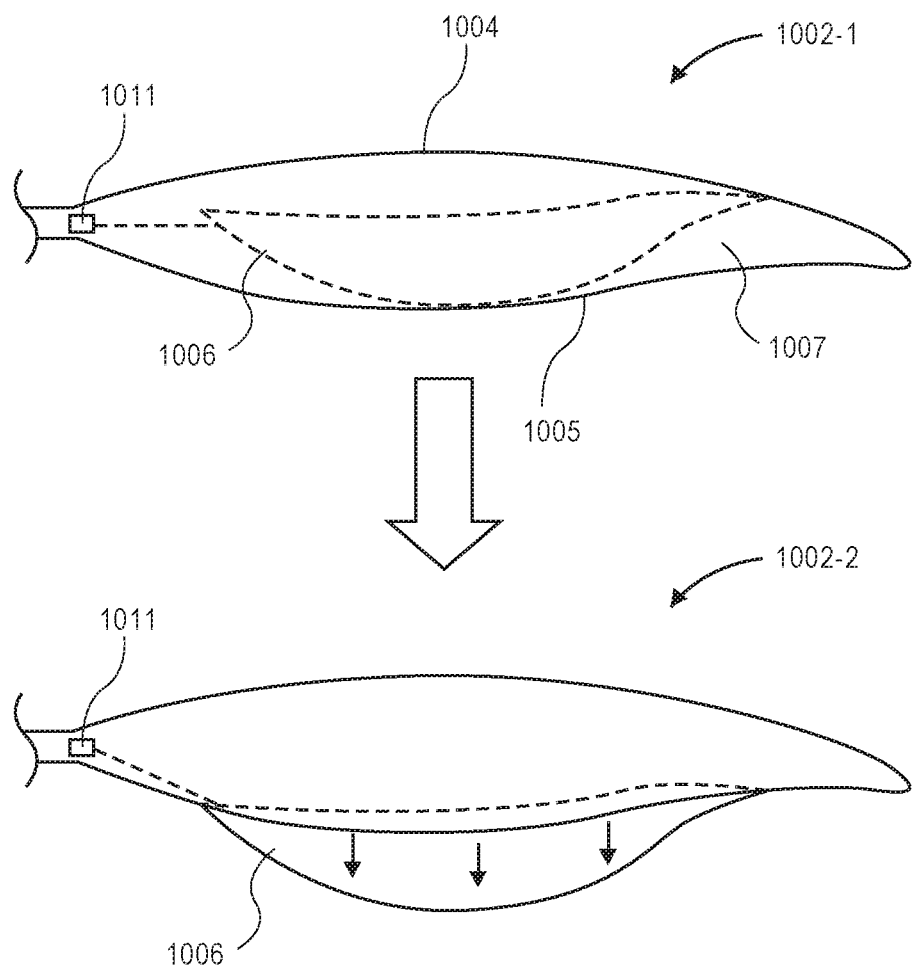
FIG. 10 illustrates a view of another adjustable propeller blade, according to an implementation.

FIG. 10 illustrates a view of another adjustable propeller blade 1002 in which a chord length of the propeller blade may be altered during operation, according to an implementation. Similar to the propeller blade discussed with respect to FIGS. 9A-9C, the propeller blade 1002 may be substantially hollow, e.g., with a solid skin defining an airfoil having a hollow cavity therein. For example, the propeller blade 1002, or portions thereof, may be formed from durable frames of stainless steel, carbon fibers, or other similarly lightweight, rigid materials and reinforced with radially aligned fiber tubes or struts.

In this example, the propeller adjustment controller includes a positionable flap 1006 that may be moved between a retracted position and an extended position. When the positionable flap is in the retracted position, as illustrated by propeller blade 1002-1, the positionable flap 1006 is retracted into the substantially hollow portion of the propeller blade 1002-1 so that the surface area and chord length of the propeller blade is defined by the leading edge 1004 of the propeller blade 1002, the trailing edge 1005 of the propeller blade 1002 and the surface area 1007 of the propeller blade.

To move the positionable flap 1006 from the retracted position to the extended position, as illustrated by propeller blade 1002-2, the propeller adjustment controller 1011 sends instructions that cause the positionable flap to extend beyond the trailing edge 1005 of the propeller blade by a defined amount. When the positionable flap 1006 is in the extended position, the surface area and chord length of the propeller blade are increased because the positionable flap extends beyond the trailing edge 1005 of the propeller blade. Essentially, the positionable flap becomes an extension of the propeller blade 1002. This increased surface area and chord length of the propeller blade results in increased lift by the propeller blade 1002, alters the sound profile generated by the propeller blade and, in some instances, alters the efficiency of the propeller blade 1002.

The positionable flap 1006 may be formed of any substantially rigid material, a flexible material, or a combination of rigid and flexible materials. For example, the positionable flap 1006 may include a substantially rigid core that is covered with a flexible material that helps dampen sound generated as air passes over the positionable flap when the positionable flap is in the extended position, as illustrated by propeller blade 1002-2.

Figure 11:
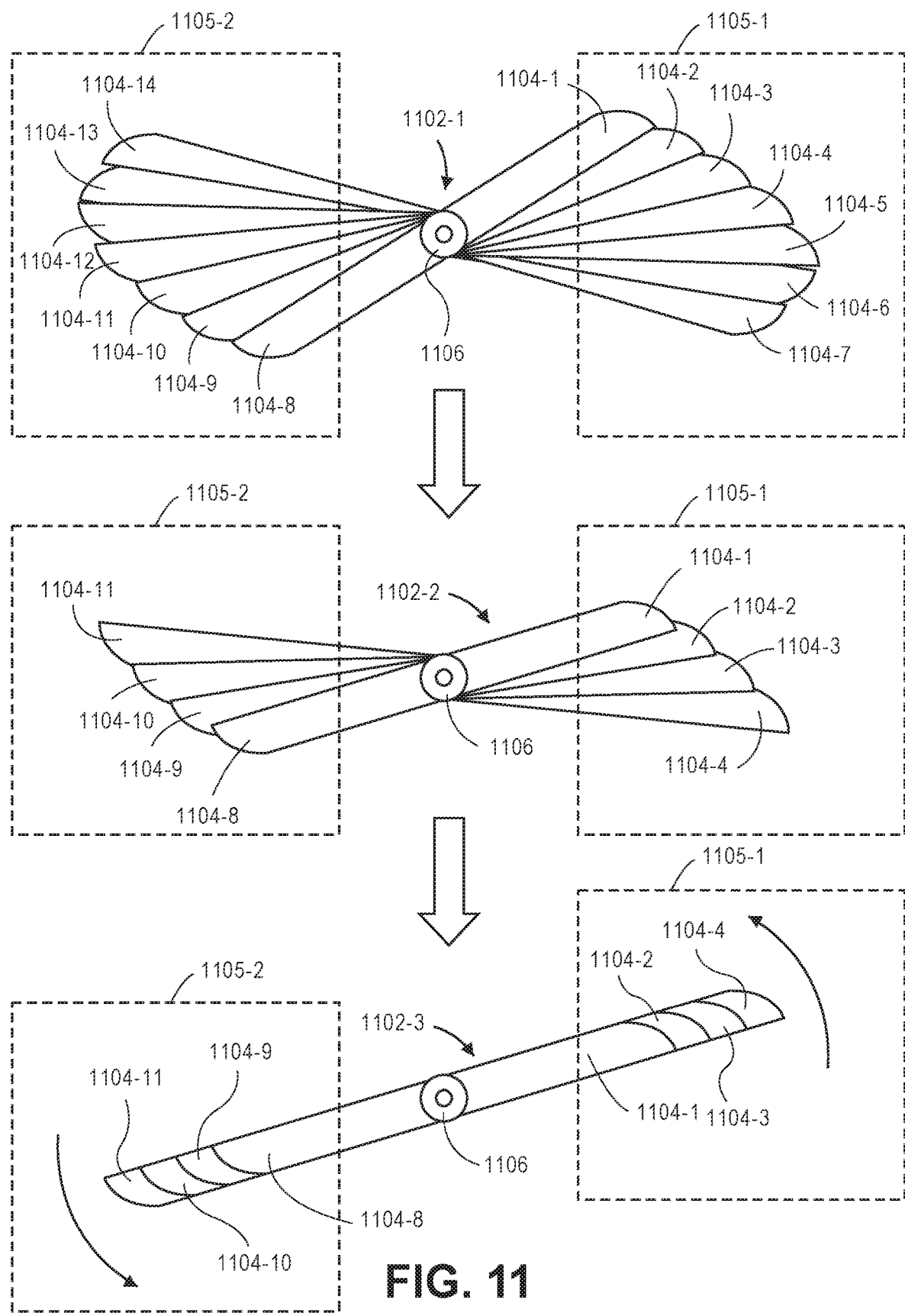
FIG. 11 illustrates a view of an adjustable propeller, according to an implementation.

FIG. 11 illustrates a view of an adjustable propeller 1102, according to an implementation. In this example, the adjustable propeller 1102 includes two propeller blades 1105-1, 1105-2 extending from a hub 1106. Each of the two propeller blades 1105-1, 1105-2 includes a plurality of adjustable sections that may be moved by the propeller adjustment controller that controls the configuration of the propeller 1102. In this example, the first propeller blade 1105-1 includes seven adjustable sections 1104-1, 1104-2, 1104-3, 1104-4, 1104-5, 1104-6, and 1104-7 and the second propeller blade 1105-2 includes an equal number of adjustable sections 1104-8, 1104-9, 1104-10, 1104-11, 1104-12, 1104-13, and 1104-14. In other implementations, the different propeller blades may have a different quantity of adjustable sections and/or some of the adjustable sections may have different sizes and/or shapes.

The different adjustable sections 1104 are arranged in a stacked configuration such that the propeller blades may be adjusted between an extended or fanned out position, as illustrated by propeller configuration 1102-1, and a vertically stacked position, as illustrated by propeller configuration 1102-3. The propeller adjustment controller may function to pivot or rotate different sections about the hub 1106 to form different propeller blade configurations. In the illustrated example, the two propeller blades are formed of joined sections so that the propeller adjustment controller can adjust one section of the first propeller blade 1105-1, which will result in the corresponding coupled section of the second propeller blade 1105-2 adjusting in a similar manner so that the overall configuration and balance of the propeller is maintained. In other implementations, each section of each propeller blade may be independently adjustable by the propeller adjustment controller.

Turning first to propeller configuration 1102-1, which illustrates the propeller configuration 1102-1 in a fanned out or extended position, each of the adjustable sections have been rotated about the hub, so that they are exposed forming a large surface area of the propeller blades. In this configuration, the propeller blades 1105-1 and 1105-2 have a largest chord length and generate a largest amount of lifting force. However, the sound profile in the configuration illustrated by propeller configuration 1102-1 may also be the loudest at a given RPM and the propeller configuration may consume the largest amount of power due to the increased surface area. However, because of the increased lift generated by the configuration 1102-1, the RPM of the motor rotating the propeller may be decreased, thereby reducing the sound generated by the propeller configuration 1102-1. As such, the propeller configuration 1102-1 may be useful during final descent toward a delivery destination or initial ascent from a delivery destination because the needed lifting force can be generated at a lower RPM because of the increased surface area. Rotating the propeller at the lower RPM reduces the sound generated by the propeller. Likewise, the larger surface area will generate more of a broadband noise, which is similar to white noise. Broadband noise is often found to be more appealing and/or acceptable to humans and/or other animals. Overall, the propeller configuration 1102-1 optimizes for sound because it allows a desired lift to be generated at a lower RPM, and produces a more appealing sound.

In comparison, propeller configuration 1102-2 illustrates a configuration in which adjustable sections 1104-5, 1104-6, and 1104-7 have been moved to a stacked position with respect to adjustable section 1104-4, and adjustable sections 1104-12, 1104-13, and 1104-14 have been moved to a stacked position with respect to adjustable section 1104-11. When partially stacked, as illustrated, the propeller blades 1105-1, 1105-2 of the propeller configuration 1102-2 have a smaller chord length and generate less lifting force, at the same RPM, compared to the propeller configuration 1102-1. Yet, because of the decreased surface area, the propeller configuration 1102-2 also consumes less power than the propeller configuration 1102-1. Specifically, when generating approximately the same lifting force as in 1102-1 using propeller configuration 1102-2, which will require a higher RPM for propeller configuration 1102-2, will consume less power than the propeller configuration 1102-1. Likewise, the sound generated by the propeller configuration 1102-2 is less than the sound generated by the propeller configuration 1102-1 when the propellers are rotated at the same RPM. However, the sound generated by the propeller configuration 1102-2 is somewhat more than the sound generated by the propeller 1102-1 when rotated at different a RPM to generate approximately the same amount of lift. Accordingly, the propeller configuration 1102-2 may be useful as an aerial vehicle begins to descend, for example, toward a delivery destination but has not reached a final descent altitude, ascends from the delivery destination but is above a defined altitude, and/or during transit when the sound generated by the aerial vehicle is not a primary concern. In addition, the propeller configuration 1102-2 provides more agility and maneuverability of the aerial vehicle than propeller configuration 1102-1 because of the lower surface area of the propeller configuration 1102-2.

Overall, the propeller configuration 1102-2 optimizes for efficiency (i.e., reduced power consumption), even though it requires higher RPM to generate the same lift as propeller configuration 1102-1 and produces a higher sound output at the higher RPM.

Finally, propeller configuration 1102-3 illustrates a configuration in which all of the adjustable sections of the propeller blades are in a stacked configuration. For example, adjustable sections 1104-2, 1104-3, 1104-4, 1104-5, 1104-6, and 1104-7 are all vertically stacked with respect to adjustable section 1104-1. The tips of adjustable sections 1104-2, 1104-3, and 1104-4 are visible because those adjustable sections are longer than the adjustable section 1104-1. However, the tips of adjustable sections 1104-5, 1104-6, and 1104-7 are not visible because they are shorter in length than adjustable section 1104-4 and are vertically stacked beneath adjustable section 1104-4. Similarly, adjustable sections 1104-9, 1104-10, 1104-11, 1104-12, 1104-13, and 1104-14 are all vertically stacked with respect to adjustable section 1104-8. The tips of adjustable sections 1104-9, 1104-10, and 1104-11 are visible because those adjustable sections are longer than the adjustable section 1104-8. However, the tips of adjustable sections 1104-12, 1104-13, and 1104-14 are not visible because they are shorter in length than adjustable section 1104-11 and are vertically stacked beneath adjustable section 1104-11.

In the propeller configuration 1102-3, the propeller produces the least amount of lift at the same RPM compared to the propeller configurations 1102-2 and 1102-1 but also consumes the least amount of power because of the reduced surface area of the propeller configuration 1102-3. Likewise, the aerial vehicle when operating with the propeller configuration 1102-3 may be more agile and maneuverable, again because of the reduced surface area compared to the surface areas of propeller configurations 1102-1 and 1102-2. However, to produce approximately a same amount of lift as either propeller configuration 1102-1 or 1102-2, the RPM must be higher for propeller configuration 1102-3. The higher RPM cause the propeller configuration 1102-3 to consume mower power and generate more sound than either propeller configuration 1102-1 or 1102-2. As such, the propeller configuration 1102-3 is optimized for agility.

In some implementations, the propeller configuration 1102-3 may be used when the aerial vehicle is in transit flight and using other lifting mechanisms (e.g., wings) to maintain flight rather than using the propulsion. Specifically, the propeller may be adjusted to propeller configuration 1102-3, which has the least amount of surface area of the configurations available for the propeller, and orient and lock the propeller in a direction of flight, thereby reducing drag produced by the propeller when the propeller is not in operation.

The adjustable sections of the propeller blades may be formed of any suitable material, such as carbon fiber. In some implementations, the adjustable sections may be formed of a flexible material or a memory metal that will take a particular shape when electrically charged. Likewise, in some implementations, the material may flex or bend into a particular shape when in the fanned or expanded position so that the exposed sections of the propeller blade align to form an airfoil shape. In comparison, when the adjustable section is vertically retracted with respect to another adjustable section, the flexible material may move to follow the curvature or shape of the adjacent adjustable section so that the profile of the stacked adjustable sections is reduced, thereby reducing drag.

The example illustrated in FIG. 11 shows three different positions or configurations that may be formed with the propeller 1102, represented as propeller configurations 1102-1, 1102-2, and 1102-3. However, it will be appreciated that additional configurations may be produced with the adjustable sections of the propeller 1102. For example, some of the adjustable sections may be exposed while others are vertically stacked.

Figure 12A:
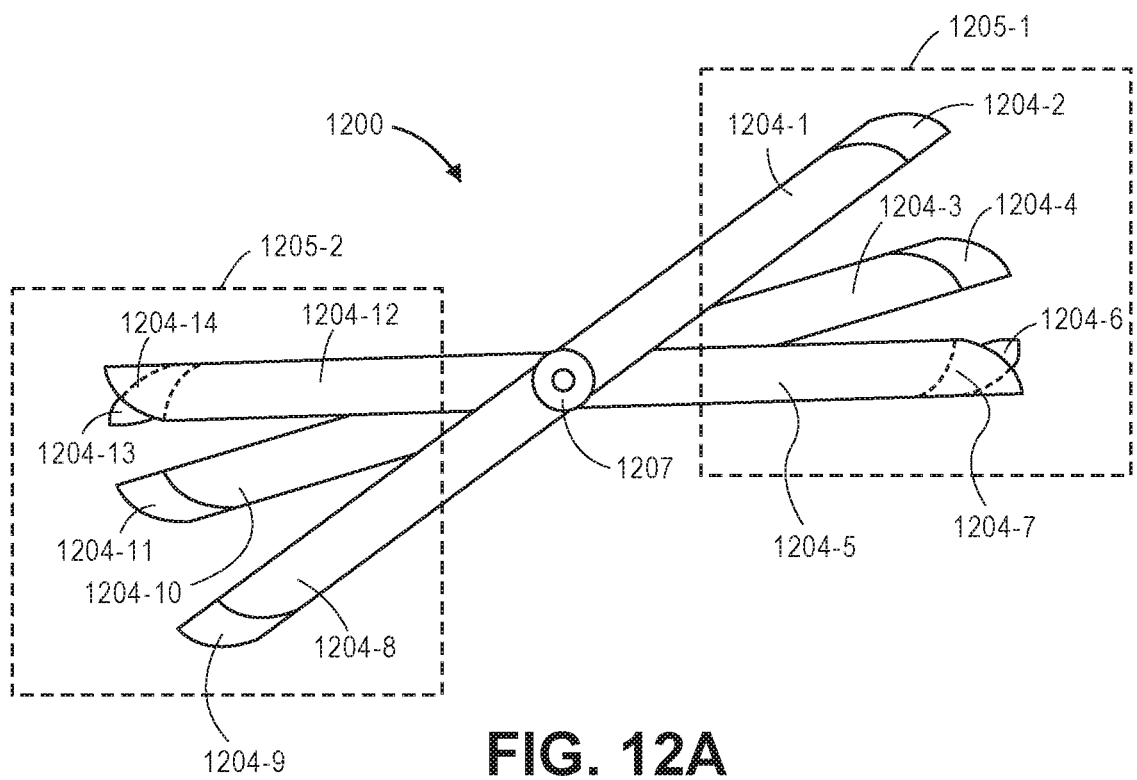
FIGS. 12A-12B illustrate additional views of an adjustable propeller, according to an implementation.

FIG. 12A provides an illustration of yet another propeller configuration that may be formed with an adjustable propeller 1202, according to an implementation. In this example, referring first to the first propeller 1205-1, adjustable sections 1204-1 and 1204-2 are vertically stacked and pivoted to a first position with respect to the hub 1207, adjustable sections 1204-3 and 1204-4 are vertically stacked and pivoted to a second position with respect to the hub 1207, and adjustable sections 1204-5, 1204-6, and 1204-7 are vertically stacked and pivoted to a second position with respect to the hub 1207. In a similar manner, referring to the second propeller blade 1205-2, adjustable sections 1204-8 and 1204-9 are vertically stacked and pivoted to a fourth position with respect to the hub 1207, adjustable sections 1204-10 and 1204-11 are vertically stacked and pivoted to a fifth position with respect to the hub 1207, and adjustable sections 1204-12, 1204-13, and 1204-14 are vertically stacked and pivoted to a sixth position with respect to the hub 1207.

In the illustrated configuration, the adjustable sections of the propeller 1202 have essentially been arranged to form six different propeller blades, each of the propeller blades generate a lifting force. Likewise, the positioning of the adjustable sections may be varied, as illustrated, or equally distributed about the hub 1207.

Figure 12B:
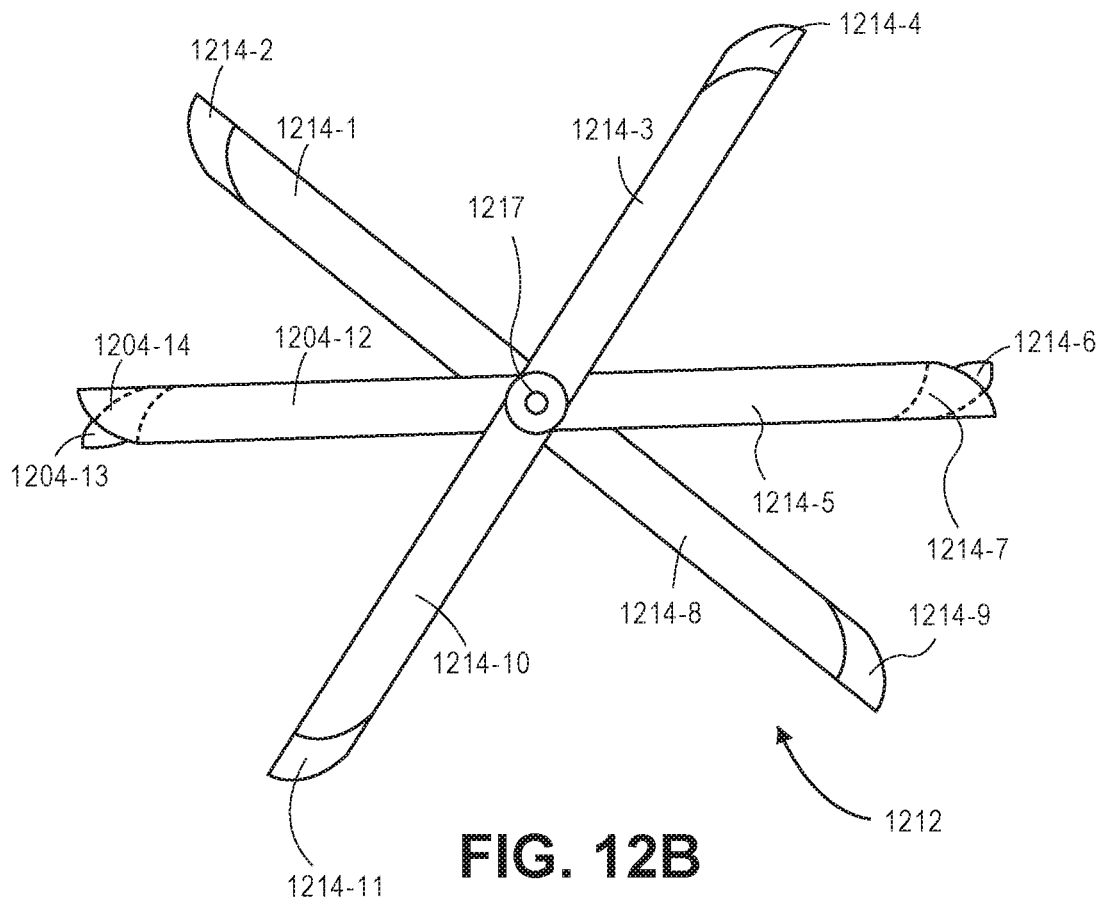

FIG. 12B provides another illustration of a propeller configuration that may be formed with an adjustable propeller 1212, according to an implementation. In this example, similar to FIG. 12A, adjustable sections 1214-1 and 1214-2 are vertically stacked and pivoted with respect to the hub 1217, adjustable sections 1214-3 and 1214-4 are vertically stacked and pivoted with respect to the hub 1217, and adjustable sections 1214-5, 1214-6, and 1214-7 are vertically stacked and pivoted with respect to the hub 1217. In a similar manner, adjustable sections 1214-8 and 1214-9 are vertically stacked and pivoted with respect to the hub 1217, adjustable sections 1214-10 and 1214-11 are vertically stacked and pivoted with respect to the hub 1217, and adjustable sections 1214-12, 1214-13, and 1214-14 are vertically stacked and pivoted with respect to the hub 1217.

In the illustrated configuration, the adjustable sections of the propeller 1212 have essentially been arranged to form six different propeller blades, each of the propeller blades generating a lifting force. In comparison to the configuration illustrated with respect to FIG. 12A, the propeller configuration 1212 includes distributing the adjustable sections approximately equally about the hub 1217. For example, because there are six adjustable sections, each section is positioned at approximately sixty degrees with respect to the next section.

Figure 13:
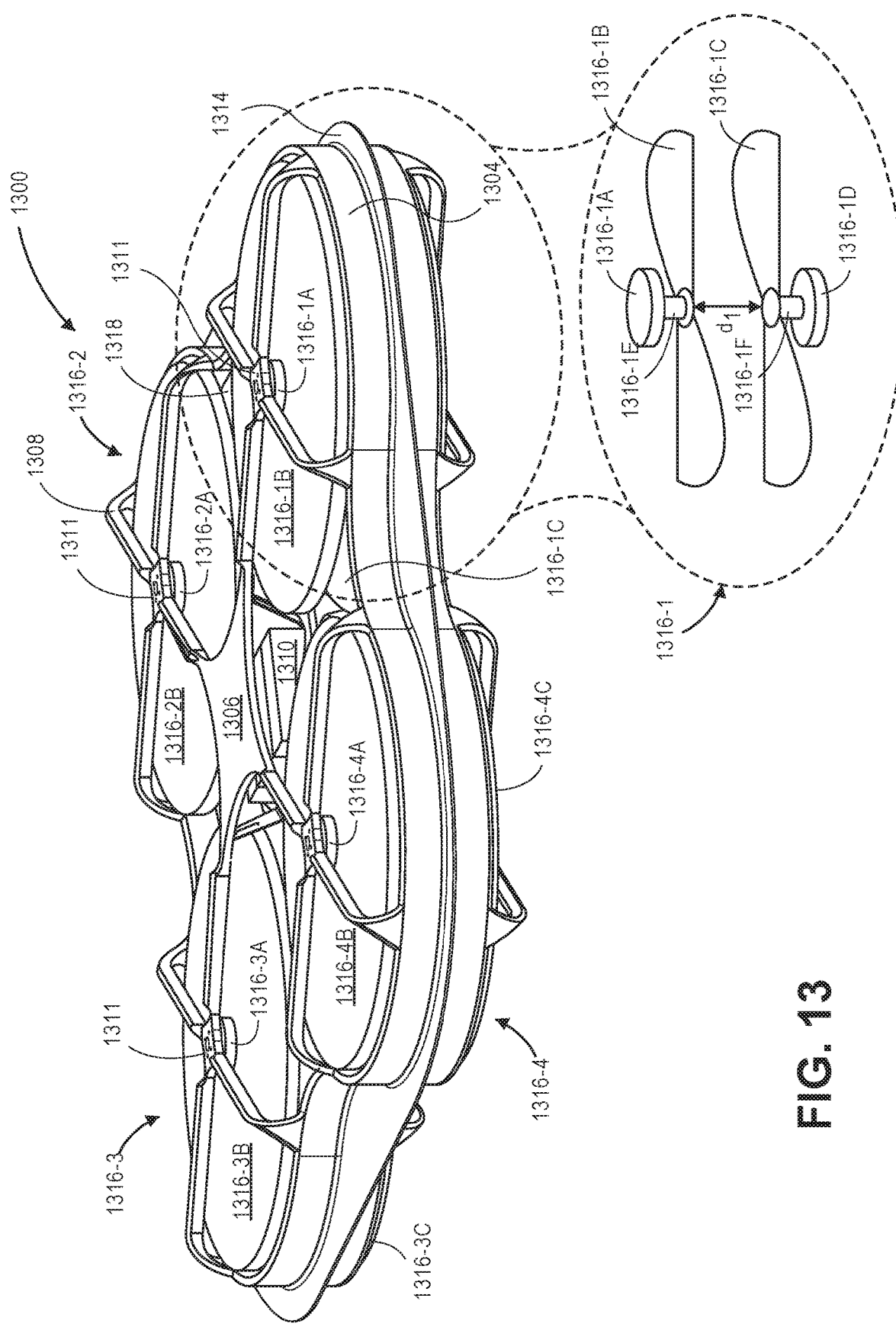
FIG. 13 depicts a view of another aerial vehicle, according to an implementation.

FIG. 13 depicts a view of another aerial vehicle configuration, according to an implementation. The body 1304 of the aerial vehicle 1300 may be formed of any suitable material, such as graphite, carbon fiber, aluminum, titanium, etc., or any combination thereof. In this example, the body 1304 of the aerial vehicle 1300 is a single carbon fiber frame. The body 1304 includes a hub 1306, propulsion mechanism arms 1308, propulsion mechanism mounts 1311, and a perimeter protective barrier 1314. In this example, there is a single hub 1306 and four propulsion mechanism arm sets 1308 that extend from the hub 1306 to a propulsion mechanism mount 1311 and then extend to a perimeter protective barrier 1314.

Within each section of the motor arms is a propulsion mechanism 1316. In the illustrated aerial vehicle 1300 configuration, the aerial vehicle 1300 includes four sets of propulsion mechanisms 1316-1, 1316-2, 1316-3, and 1316-4. In this configuration, each propulsion mechanism includes two motors and two propellers that are coaxially aligned. For example, as illustrated by the expanded view of propulsion mechanism 1316-1, the propulsion mechanisms include an upper motor 1316-1A that is coupled to a motor arm on the upper side of the aerial vehicle and a lower motor 1316-1D that is coupled to a motor arm on the lower side of the aerial vehicle. The upper motor 1316-1A and the lower motor 1316-1D are vertically aligned.

The upper motor 1316-1A includes a first shaft 1316-1E that extends downward toward the lower motor 1316-1D, and the lower motor 1316-1D includes a second shaft 1316-1F that extends upward toward the upper motor 1316-1A. Coupled to the first shaft is a first propeller 1316-1B that is rotated by the first shaft 1316-1E when the first shaft 1316-1E is rotated by the upper motor 1316-1A. Coupled to the second shaft is a second propeller 1316-1C that is rotated by the second shaft 1316-1F when the second shaft 1316-1F is rotated by the lower motor 1316-1D.

The propellers 1316-1B, 1316-1C, even though coupled to different shafts, are coaxially aligned. In addition, the propellers are separated by a distance $d_1$. Likewise, rather than counter-rotating the propellers 1316-1B, 1316-1C, during some modes of operation the propellers may be in rotational phase alignment and rotated in the same direction (co-rotated).

Selecting a distance $d_1$, rotationally phase aligning, and co-rotating the coaxially aligned propellers is done to reduce or otherwise alter sound generated by the high-pressure pulse of the induced flow from the rotation of the propellers. Induced flow is the airflow that is forced through a propeller and moving in the same or similar direction along the axis of the shaft that is rotating the propeller. The induced flow is caused by the deflection of air by the passage of a propeller blade. Induced flow moves downward away from the propeller in a spiral pattern due to the rotation of the propeller blade, creating a sinusoidal waveform at the perimeter of the induced flow. The induced flow includes a high-pressure pulse generated from the tip and other portions of the propeller blade that generate the sound heard from the rotation of the propeller blades. The high-pressure pulse represents a sinusoidal waveform as it spirals down and away from the propeller.

The distance $d_1$ is selected so that the waveform of the high-pressure pulse induced flow resulting from the rotation of the first propeller 1316-1B is substantially out-of-phase (e.g., having polarities that are reversed with respect to polarities of the predicted sounds) to the waveform of the high-pressure pulse of the induced flow resulting from the rotation of the second propeller 1316-1C, when the first propeller 1316-1B is in rotational phase alignment with the second propeller 1316-1C. In some implementations, the rotational phase alignment of the two propellers with respect to each other may be adjusted so that the two waveforms cause destructive interference with one another, thereby reducing the sound from the high-pressure pulses.

By positioning the two coaxially aligned propellers so that the resulting waveforms are out-of-phase, the waveforms cause interference that results in at least a portion of the sound generated by the high-pressure pulses of the induced flows from the two propellers being altered. For example, the interference may be destructive interference that causes at least a portion of the two sounds to be canceled out or otherwise altered.

The aerial vehicle control system 1310 may be mounted to the body of the aerial vehicle and one or more components (e.g., antenna, camera, gimbal, radar, distance-determining elements) may be mounted to the body, as discussed above.

Figure 14:
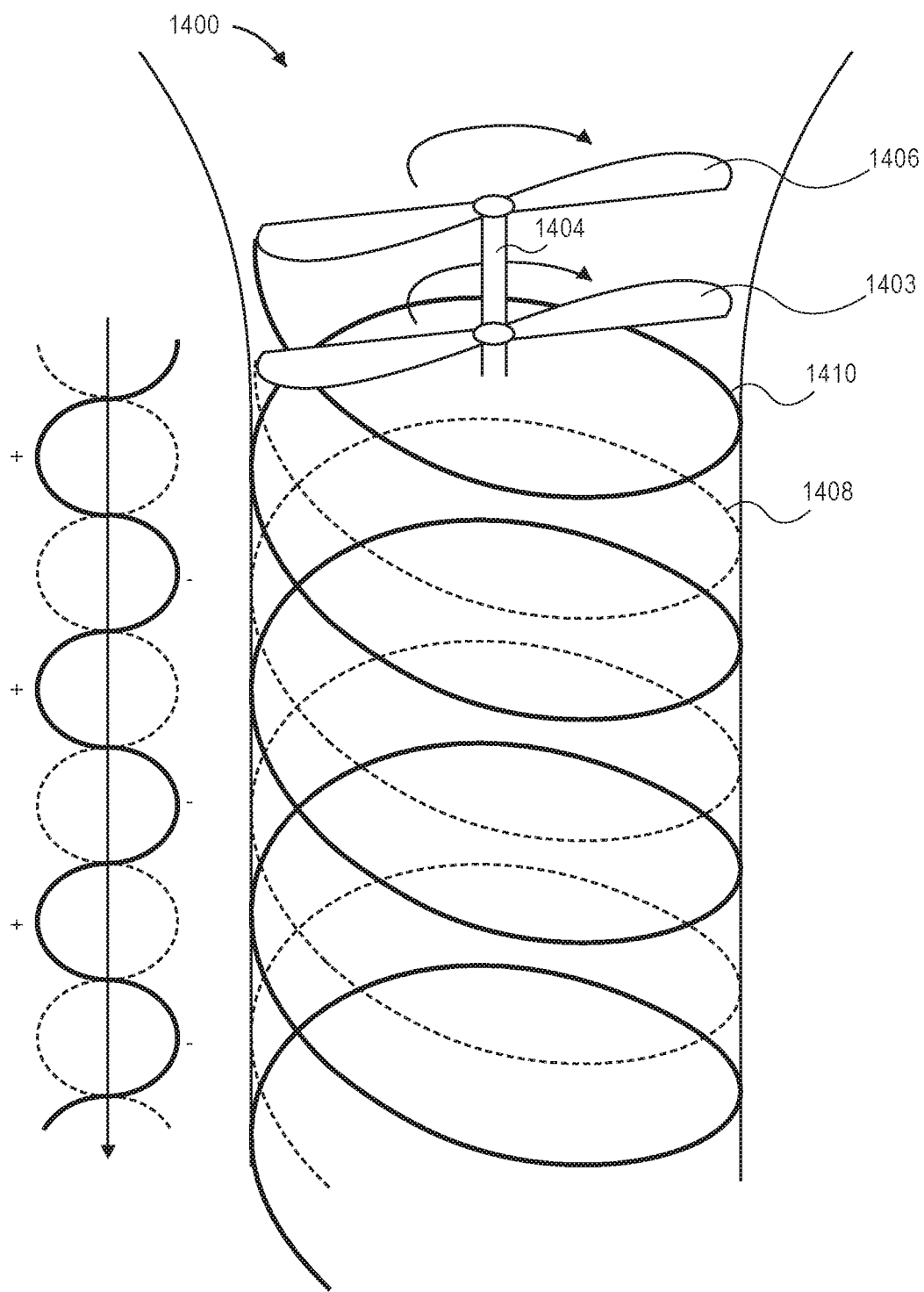
FIG. 14 depicts an illustration of induced flows from coaxially aligned propellers, according to an implementation.

FIG. 14 depicts an illustration of induced flows from a propulsion mechanism 1400 that includes two coaxially aligned propellers 1403, 1406, according to an implementation. For ease of discussion, the motor and other components have been eliminated from the illustration in FIG. 14. As illustrated, the lower propeller 1403 and the upper propeller 1406 are phase aligned, both rotate about a shaft 1404 in a clockwise direction, and both generate an induced flow that progresses downward away from the propellers.

Coaxially stacked propellers are considered to be phase aligned when there is approximately no offset between the two propellers. For example, the two propellers 1403 and 1406 are in rotational phase alignment because the propeller blades are aligned so that if viewing the propellers from a top-down perspective you would only be able to see the upper propeller 1406. For coaxially stacked propellers having the same design, any arbitrary feature (e.g., leading edges, blade centers, trailing edges, etc.) of the two (or more) propellers may be aligned to achieve phase alignment. However, in circumstances where one or more propellers differ, "phase alignment" may differ depending on which particular feature is being used as a reference point. Thus, for two coaxial but distinct propeller designs, a phase alignment based upon leading edges may differ from phase alignment based upon blade center or trailing edges. Thus, for purposes of specificity, the term "phase alignment" may be modified to be described as "leading edge phase alignment," "trailing edge phase alignment," or "blade center phase alignment" when the two propellers have different designs, features, and/or configurations. It should be understood by those having ordinary skill that any number of phase alignments may be described and used and that the present disclosure is not limited to alignments based solely upon leading edges, trailing edges, or blade centers.

By phase aligning the coaxially aligned propellers and separating them a defined distance, the waveform generated by the upper propeller 1406 will be substantially inverted, or out-of-phase from the waveform generated by the lower propeller 1403. The destructive interference of the combined waveforms alters the sound generated by the propulsion mechanism. In selected implementations, the defined distance between propellers 1403 and 1406 may be calculated based upon the propeller geometry and computational analysis (e.g., computational fluid dynamics or finite element analysis). In other implementations, the distance between propellers may be determined experimentally by adjusting the coaxial spacing of the propellers to alter the sound generated to a more desirable state. In the latter method, audio sensors may be used to provide real-time feedback as the aerial vehicle (e.g., 1300 of FIG. 13) is operated.

In this example, the clockwise rotation of the lower propeller 1403 generates an induced flow 1408 that moves away from the lower propeller 1403 in a spiral pattern. Likewise, the clockwise rotation of the upper propeller 1406 generates an induced flow 1410 that also moves away from the upper propeller 1406 in a spiral pattern. Because the lower propeller 1403 and the upper propeller 1406 are coaxially aligned, rotationally phase aligned, and separated by a defined distance, the waveform or high-pressure pulse of the induced flow 1410 from the upper propeller 1406 causes destructive interference with the waveform or high-pressure pulse of the induced flow 1408 from the lower propeller 1403, thereby reducing the sound resulting from the rotation of the propulsion mechanism 1400.

While this example illustrates the induced flow waveforms forming off the tips of the propellers 1403, 1406, it will be appreciated that induced flow waveforms are generated from all segments of the propeller blades at different amplitudes. By offsetting and aligning the propellers in the manner discussed herein, the waveforms generated by each segment of the propellers cause destructive interference and reduce generated sound. Describing the implementations with respect to the induced flow generated from the tips of the propeller blades is for ease of discussion only and it will be appreciated that the implementations are equally applicable to reducing sound generated from waveforms generated along any portion of the propellers as the propellers rotate.

Figure 15A:
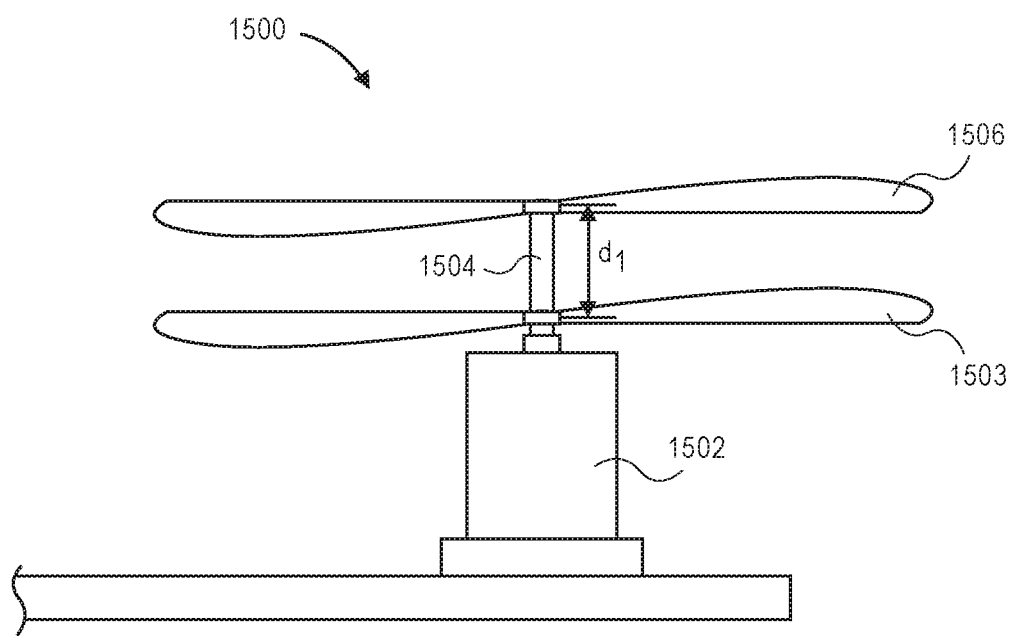
FIGS. 15A-15B depict a motor with a pair of coaxially aligned propellers, according to an implementation.
Figure 15B:
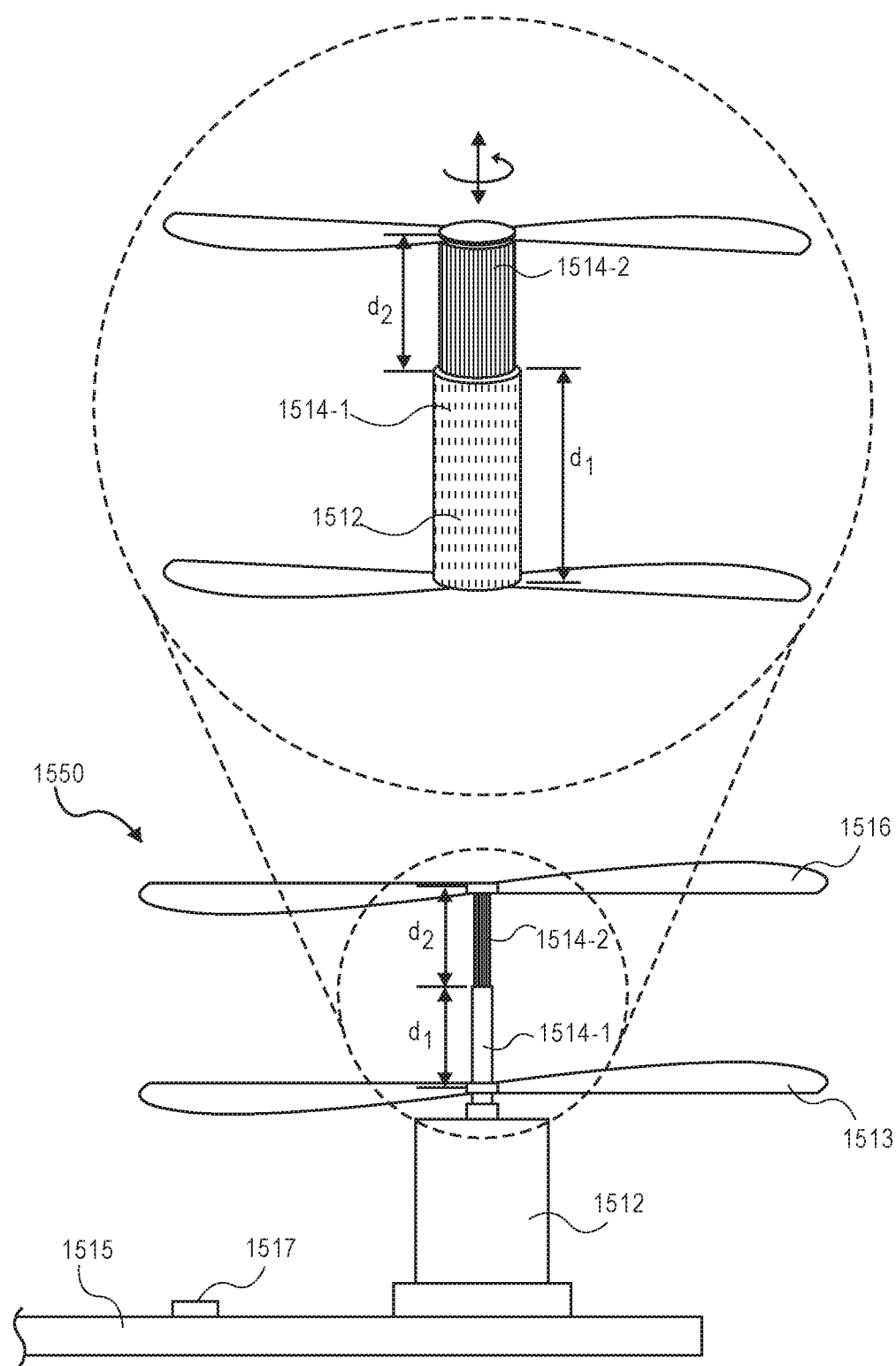

FIGS. 15A-15B depict the propulsion mechanism 1500 with a motor 1502, a lower propeller 1503, and an upper propeller 1506, according to an implementation. In the example illustrated in FIG. 15A, the lower propeller 1503 and the upper propeller are coupled to a fixed length shaft 1504 and separated a distance $d_1$. The distance $d_1$ may be selected based on the operating characteristics of the propulsion mechanism 1500. For example, a rotational speed may be determined at which the propulsion mechanism is operating within its most efficient power-to-lift range. Likewise, the pitch of the propeller blades and the resulting waveform generated at that rotational speed may be determined for the lower propeller 1503 and the upper propeller 1506. Based on the determined waveforms, the distance $d_1$ may be selected that will cause a waveform from the upper propeller 1506 to be substantially out-of-phase with the waveform from the lower propeller 1503.

In some implementations, the same propeller size and shape may be used for the upper propeller 1506 and the lower propeller 1503 so that the generated waveforms and induced flows are symmetrical. However, in other implementations, because of the altered shape of the airflow passing through the lower propeller 1503, due to the induced flow generated by the upper propeller 1506, the waveform of the lower propeller 1503 may be different. In such an example, the pitch, size, shape and/or other characteristics of either, or both, the upper propeller 1506 and the lower propeller 1503 may be altered so that the waveforms have approximately the same period and amplitude. For example, FIG. 16, discussed below, illustrates a configuration of coaxially aligned propellers in which each propeller has a different size and configuration.

In still other implementations, in addition to separating the upper propeller 1506 and the lower propeller 1503 a defined distance $d_1$, the rotational phase alignment of the propeller blades may be offset a defined amount so that the combination of the distance $d_1$ and the alignment offset of the propeller blades results in the waveform of the induced flow from the upper propeller 1506 to be substantially out-of-phase from the induced flow from the lower propeller 1503.

In the example illustrated in FIG. 15B, the lower propeller 1513 and the upper propeller 1516 are coupled to an adjustable length shaft 1514. As illustrated in the expanded view, the adjustable shaft may be adjusted radially (extended or retracted) or rotationally (clockwise or counter-clockwise). In some implementations, a sensor 1517, such as a microphone, may be affixed to the motor arm 1515 to which the propulsion mechanism 1550 is attached. The sensor 1517 may measure sound generated by the propulsion mechanism and the shaft may be adjusted so that the waveforms of the high-pressure pulses from the induced flow generated by each of the propellers 1513, 1516 are out-of-phase and cause destructive interference, thereby reducing the generated sound. For example, the shaft may be radially extended a distance $d_2$ to increase the separation of the lower propeller 1513 and the upper propeller 1516. As the shaft is extended, the sensor may continue to measure the generated sound and provide feedback to the aerial vehicle control system indicating whether the sound is increasing or decreasing. The shaft may continue to be extended until the sound stops decreasing. Alternatively, the shaft may be contracted and the sound measured by the sensor 1517 to determine when to stop contracting the shaft 1514.

In addition to extending or contracting the shaft 1514, the alignment of the propellers 1513, 1516 may be adjusted by rotating the upper portion of the shaft 1514-2 with respect to the lower portion of the shaft 1514-1. Adjusting the rotational phase alignment of the propellers 1513, 1516 may be done in addition to or as an alternative to adjusting the distance between the propellers 1513, 1516. For example, once a distance between the propellers is determined at which the generated sound is at a minimum for that rotational speed of the propulsion mechanism, the rotational phase alignment of the propellers 1513, 1516 may be adjusted. During adjustment of the rotational phase alignment of the propellers, the sensor 1517 may continue to measure the generated sound to determine an alignment in which the generated sound is at its lowest.

In still another example, the pitch and/or other configuration of one or more propeller blades of the lower propeller 1513 and/or the upper propeller 1516 may be adjustable to alter the waveform of the induced flow from the propeller as the propellers are rotated by the motor 1512. As the pitch of the propeller increases, the lift generated by the propeller also increases for the same rotational speed. Likewise, the waveform of the induced flow is altered. In some implementations, the sensor 1517 may measure the sound generated by the propulsion mechanism as the pitch of one or more propeller blades is altered to determine when a minimum sound level is reached.

The adjustment of the shaft (radially and/or rotationally), and/or the pitch of the propeller blades may be continuously or periodically performed during operation of the aerial vehicle. Alternatively, certain areas or altitudes may be designated as reduced sound areas and the adjustment of the propulsion mechanism may only be made when the aerial vehicle is operating on those areas.

Figure 16:
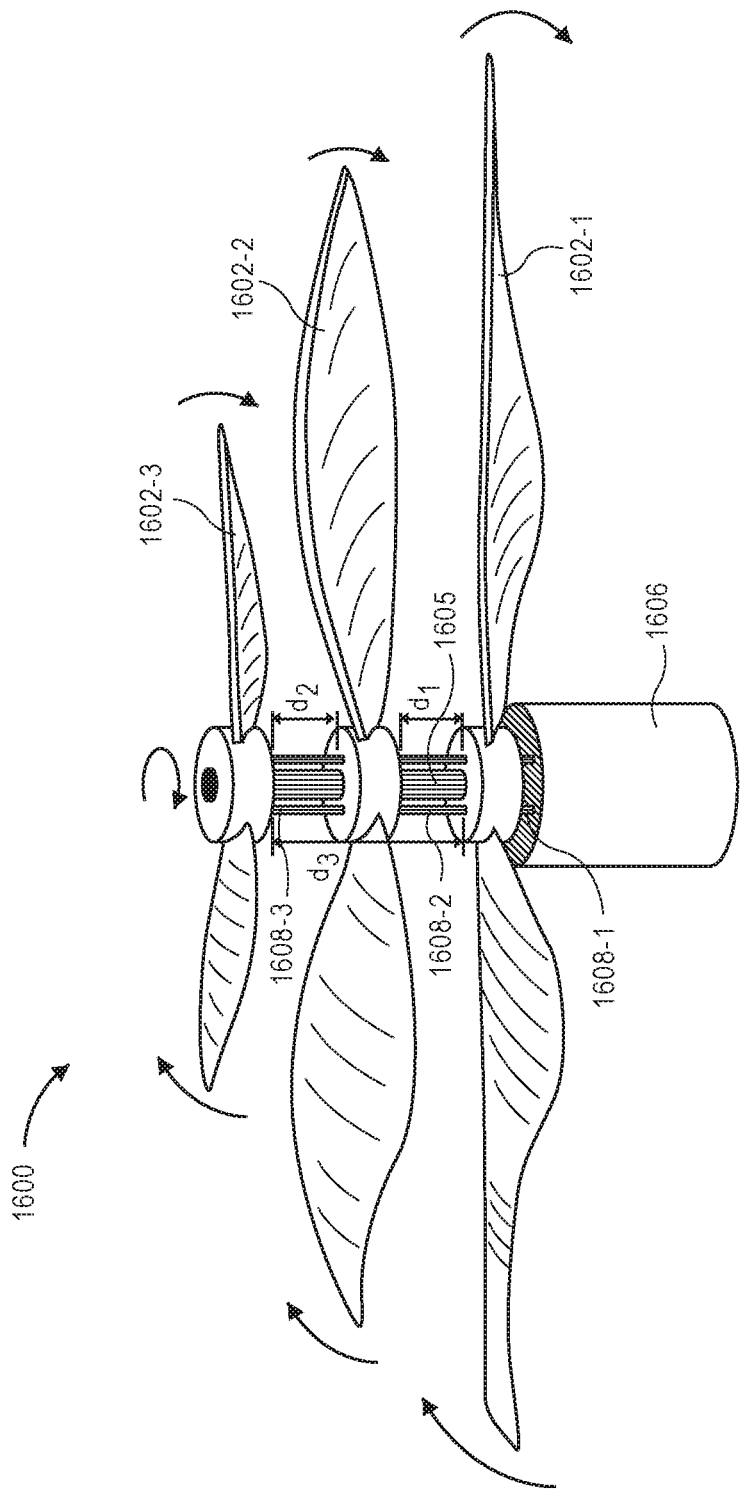
FIG. 16 illustrates a view of coaxially aligned propellers, according to an implementation.

FIG. 16 illustrates another view of coaxially aligned and stacked propellers, according to an implementation. In this example, the propulsion mechanism 1600 includes a motor 1606 with a shaft 1605 extending therefrom that is rotatable by the motor 1606. Three propellers 1602-1, 1602-2, and 1602-3 are positioned along the shaft 1605 in a coaxially aligned and stacked configuration. Similar to the discussions above, the distance $d_1$ may be selected so that the sound from the high pressure pulse generated by rotation of the first propeller 1602-1 causes interference with the sound from the high pressure pulse generated by rotation of the second propeller 1602-2. Likewise, the distance $d_2$ may be selected so that the sound from the high pressure pulse generated by rotation of the second propeller 1602-2 causes interference with the sound from the high pressure pulse generated by rotation of the third propeller 1602-3 and/or interferes with a net effect resulting from the interference between the sound from the first propeller and the sound from the second propeller.

When the sound from the first propeller 1602-1 interferes with the sound from the second propeller 1602-2, the resulting combination is referred to herein as a net effect. If the interference is destructive, the net effect may be a reduced amplitude and/or reduced frequency sound. Likewise, when the sound from the third propeller interferes with the net effect sound, the two sounds combine and form a combined net effect sound.

In some implementations, the distance $d_3$ may also be selected so that the sound from the high pressure pulse generated by rotation of the third propeller 1602-3 interferes with the sound from the high pressure pulse generated by the first propeller 1602-1.

As illustrated and discussed above, the propellers 1602-1, 1602-2, and 1602-3 may have different sizes, diameters, chord lengths, cambers, pitches, thicknesses, etc. (generally characteristics) and generate different lifting forces, have different operational efficiencies, and have different sound profiles at the same RPM. For example, the first propeller 1602-1 may have a first diameter and a first pitch that is optimized to generate a lifting force. The second propeller 1602-2 may have a second diameter and second pitch that is optimized for maneuverability, and the third propeller 1602-3 may have a third diameter and third pitch that is optimized for sound. While the example illustrated with respect to FIG. 16 shows the largest propeller being closest to the motor and the smallest propeller being furthest from the motor, in other configurations the different sizes of propellers may be at different positions along the shaft. For example, the largest propeller may be furthest from the motor, at a mid-point between multiple propellers, etc.

As discussed herein, the sounds expected to be generated by the propellers, alone and/or in combination, may be measured and stored in a memory of the aerial vehicle controller for different RPMs of the motor. Likewise, based on the expected sound profiles of the propellers at different RPMs, the distances d1, d2, and d3 may be selected to produce a desired combined net effect when all three of the propellers are rotating and/or a desired net effect when two of the propellers are rotating.

In addition to or as an alternative to separating the propellers 1602 a defined distance so that generated sounds cause interference with one another, in some implementations, the different propellers may be individually selectable such that a propeller adjustment controller 1608 can individually engage and rotate one or more of the propellers 1602-1, 1602-2, or 1602-3. For example, the propellers 1602-1, 1602-2, and 1602-3 may be coaxially aligned, positioned along the shaft 1605 at different distances and individually engaged by the propeller adjustment controller 1608 such that the engaged propeller(s) rotates with a rotation of the shaft. The propeller adjustment controller 1608 may include a series of clutches 1608-1, 1608-2, and 1608-3 or gears that can be used to selectively engage one or more of the propellers 1602-1, 1602-2, and 1602-3. In other implementations, the propeller adjustment controller may include In some implementations, the propeller adjustment controller 1608 may receive or determine an operational profile for the aerial vehicle and/or receive a commanded lifting force. Based on the different characteristics maintained for the different propellers of the propulsion mechanism 1600, the propeller adjustment controller may select and engage one or more propellers to generate the commanded lifting force that will optimize the propulsion mechanism according to the determined operational profile. For example, if the operation profile indicates that the propulsion mechanism is to be optimized for efficiency and/or lift, the propeller adjustment controller may engage the first propeller 1602-1, which will generate the greatest amount of lift when the motor 1606 is rotating at a defined RPM.

In comparison, if the propeller adjustment controller determines that the propulsion mechanism is to be optimized for agility, the propeller adjustment controller may select and engage the second propeller 1602-2 so that the second propeller 1602-2 is rotated by the motor at the RPM. As another example, if the propeller adjustment controller determines that the propulsion mechanism is to be optimized for sound, it may engage the third propeller 1602-3 so that the third propeller 1602-3 is rotated by the motor at the RPM.

In some implementations, it may be determined that two or more of the propellers are to be simultaneously engaged by the propeller adjustment controller. For example, as discussed above, the first propeller and the second propeller may be coaxially and phase aligned and separated a distance $d_1$ so that the sound generated by the first propeller causes interference with the sound generated by the second propeller to produce a net effect that is a reduced sound. In such a configuration, the propulsion mechanism may be optimized for lifting and sound at the selected RPM. For example, the lifting force generated by rotation of both the first propeller 1602-1 and the second propeller 1602-2 may provide sufficient lift at the RPM and the net effect resulting from the combination of the sound from the first propeller and the sound from the second propeller may be less than a sound generated by the first propeller operating alone.

Propellers that are not engaged by the propeller adjustment controller 1608 may be allowed to freely rotate about the shaft of the motor as the engaged propellers are rotated by the motor. Alternatively, the non-engaged propellers may be secured in a fixed position with respect to the shaft so that the non-engaged propellers do not rotate when not engaged by the propeller adjustment controller.

In some implementations, the propeller adjustment controller may determine or receive a commanded lifting force to be produced by the propulsion mechanism and determine, based at least in part on an engagement of the first propeller, the second propeller, and/or the third propeller an RPM needed for the motor of the propulsion mechanism such that the engaged propellers will generate the commanded lifting force when rotated.

Figure 17:
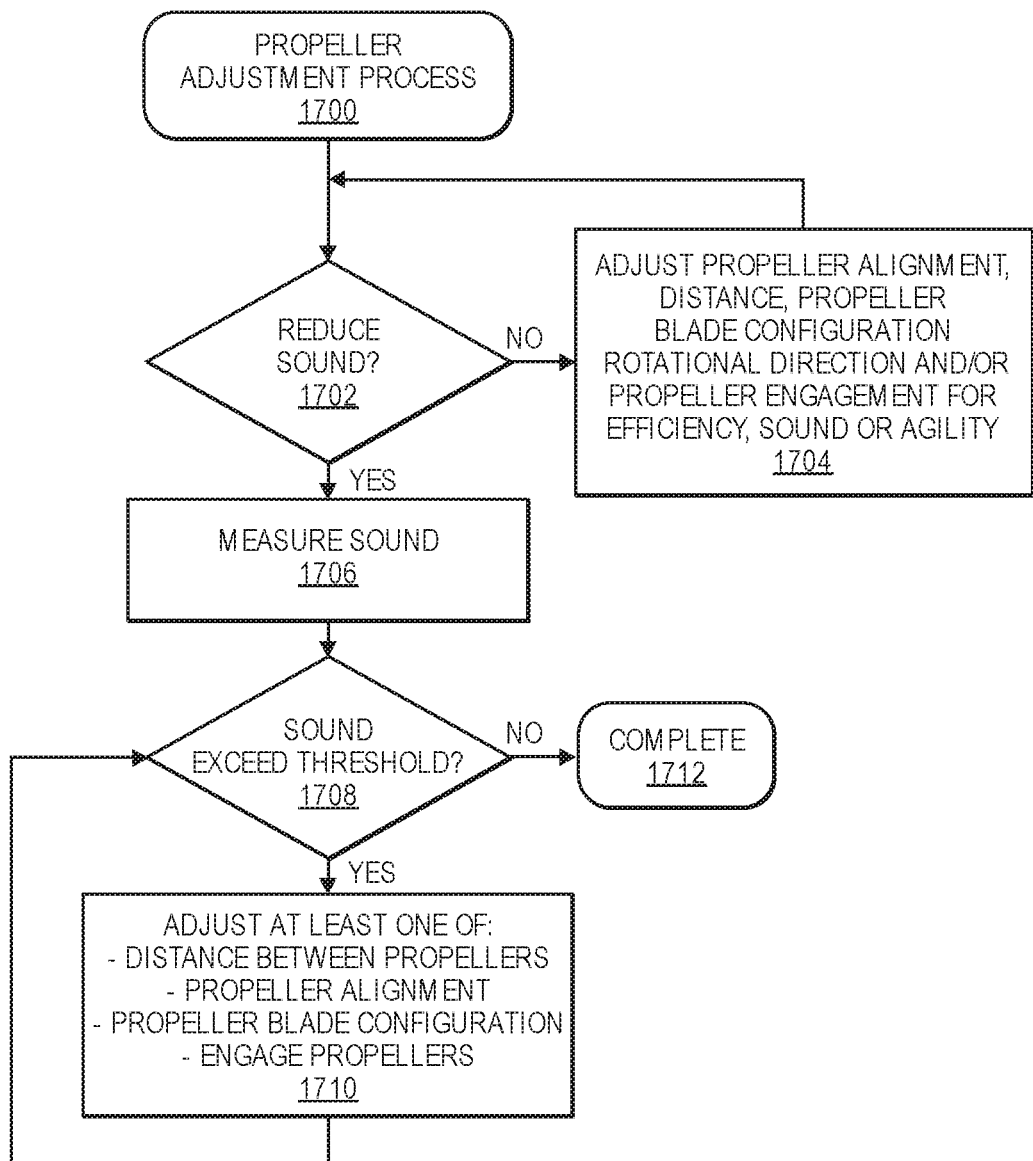
FIG. 17 is a flow diagram illustrating an example propeller adjustment process, according to an implementation.

FIG. 17 is a flow diagram illustrating an example propeller adjustment process 1700, according to an implementation. The example process 1700 of FIG. 17 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the routine.

The example process 1700 begins by determining if the sound from the induced flow of a propulsion mechanism is to be reduced, as in 1702. In some implementations, it may be determined that sound from induced flow is to be reduced during any operation of the aerial vehicle. In other implementations, it may be determined that sound from the induced flow of a propulsion mechanism is only to be performed when the aerial vehicle is in designated areas or below designated altitudes.

If it is determined that the sound from the induced flow is not to be reduced, the distance between the propellers of the propulsion mechanism, the rotational phase alignment of the propellers, the pitch of one or more of the propeller blades, the rotational direction of the propellers, the configuration of one or more of the propeller blades, and/or the engagement/disengagement of one or more of the propellers may be adjusted so that the propulsion mechanism is optimized for efficiency, sound, or agility, as in 1704. For example, reducing sound using the techniques discussed herein may increase the power consumption required to rotate the propeller, thus reducing the efficiency of the propulsion mechanism. If reduced sound is not needed, such as when the aerial vehicle is flying at a high altitude, the propulsion mechanism may be adjusted to optimize for efficiency. In comparison, if it is determined that the aerial vehicle must maneuver in a small or confined space, it may be determined that the propeller configuration is to be optimized for agility.

If it is determined that the sound resulting from the propulsion mechanism is to be reduced, the generated sound is measured by one or more sensors positioned on the aerial vehicle, as in 1706. As discussed above, the sensor may be positioned on a motor arm beneath the propeller of the propulsion mechanism, or at another location.

Based on the measured sound, a determination is made as to whether the sound exceeds a threshold, as in 1708. If it is determined that the measured sound exceeds a threshold, at least one of the distance between the propellers of the propulsion mechanism, the rotational phase alignment of the propellers of the propulsion mechanism, the pitch or other characteristic of one or more of the blades of the propellers of the propulsion mechanism and/or an engagement of one or more of the propeller blades are adjusted to decrease or otherwise alter the sound generated by the propulsion mechanism, as in 1710. The process of making one or more of the adjustments discussed with respect to block 1710 may be continually performed until the measured sound is below the threshold. Alternatively, adjustments may be periodically made and the measured sound compared to a measured sound prior to the adjustment. If the current measured sound is less than the prior measured sound, additional adjustments are made. If the current measured sound is greater than the prior measured sound, the adjustment is removed. This process of adjusting one or more components of the propulsion mechanism may continue until it is determined that the sound from the propulsion mechanism is no longer to be reduced (e.g., the aerial vehicle has ceased operation, or the aerial vehicle has navigated out of a designated area). If it is determined that the threshold is not exceeded, the example process completes, as in 1712.

Figure 18:
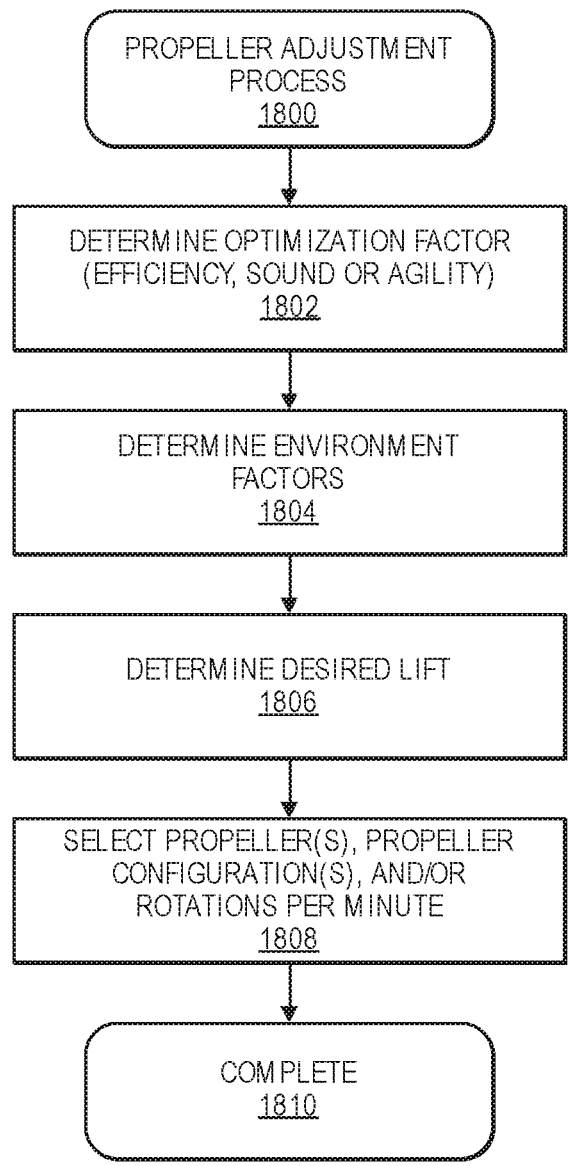
FIG. 18 is a flow diagram of an example propeller adjustment process, according to an implementation.

FIG. 18 is a flow diagram illustrating another example propeller adjustment process 1800 for altering a sound generated by a propulsion mechanism, according to an implementation. The example process 1800 begins by determining an optimization factor for which the propulsion mechanism is to be optimized, as in 1802. For example, it may be determined whether the propulsion mechanism is to be optimized for efficiency, sound, or agility.

One or more environmental factors that may influence the generated sound from the propulsion mechanism may likewise be determined, as in 1804. As discussed above, environmental factors may be intrinsic or extrinsic. Extrinsic data is data not directly relating to the aerial vehicle. Intrinsic data is data relating to the aerial vehicle itself. For example, extrinsic information or data may include, but is not limited to, environmental conditions (e.g., temperature, pressure, humidity, wind speed, and wind direction), times of day or days of a week, month or year when an aerial vehicle is operating, measures of cloud coverage, sunshine, surface conditions or textures (e.g., whether surfaces are wet, dry, covered with sand or snow or have any other texture) within a given environment, a phase of the moon, ocean tides, the direction of the earth's magnetic field, a pollution level in the air, a particulates count, or any other factors within the given environment. Intrinsic information or data may include, but is not limited to, operational characteristics (e.g., dynamic attributes such as altitudes, courses, speeds, rates of climb or descent, turn rates, or accelerations; or physical attributes such as dimensions of structures or frames, numbers of propellers or motors, operating speeds of such motors) or tracked positions (e.g., latitudes and/or longitudes) of the aerial vehicles. In accordance with the present disclosure, the amount, the type and the variety of information or data that may be captured and collected regarding the physical or operational environments in which aerial vehicles are operating and correlated with information or data regarding measured sounds is theoretically unbounded.

The example process may also determine a lift to be generated by the propulsion mechanism, as in 1806. For example, a commanded lift may be received or determined that is to be generated by the propulsion mechanism to aerially navigate the aerial vehicle along a flight path. The commanded lift may be determined and/or provided by one or more components of the aerial vehicle control system.

Based on the determined optimization factor, desired lifting force to be generated, and optionally the environmental factors, a configuration for the propulsion mechanism is determined, as in 1808. Such configuration for the propulsion mechanism may specify one or more of a propeller or propellers to be engaged for operation, an RPM at which a motor is to rotate the engaged propeller(s), and/or a configuration of the engaged propellers (e.g., a pitch, alignment, chord length, camber, position, thickness, diameter, etc.), surface area, etc. Instructions are then sent that cause the propulsion mechanism to be configured accordingly and the example process 1800 completes, as in 1810.

FIG. 19 is a view of an aerial vehicle, according to an implementation. As illustrated, the aerial vehicle may include a variety of different propulsion mechanisms, two or more of the propulsion mechanisms having different configurations. For example, propulsion mechanism 1902-1, as illustrated in the expanded view, may include a motor and a propeller with two propeller blades. In some implementations, the propeller blades of the propulsion mechanism 1902-1 may be fixed or adjustable, as discussed herein, such that one or more characteristics (e.g., pitch, angle of attack, camber, chord length, thickness, etc.) can be adjusted by a propeller adjustment controller.

Propulsion mechanism 1902-2 may include a motor with a series of coaxially aligned and stacked propulsion mechanisms, similar to the configurations discussed herein with respect to FIGS. 13-16. Likewise, the propeller blades of the coaxially aligned and stacked propellers of propulsion mechanism 1902-2 may be fixed or adjustable, as discussed herein, such that one or more characteristics (e.g., pitch, angle of attack, camber, chord length, thickness, etc.) can be adjusted by a propeller adjustment controller.

Propulsion mechanism 1902-3 may include a motor with a propeller that includes a plurality of adjustable sections, similar to the configurations discussed herein with respect to FIGS. 11-12B.

Propulsion mechanism 1902-4 may include a motor with a series of telescoping propeller blades, similar to the configurations discussed herein with respect to FIGS. 2-6. Likewise, the propeller blades of the telescoping propellers may be fixed or adjustable, as discussed herein, such that one or more characteristics (e.g., pitch, angle of attack, camber, chord length, thickness, etc.) can be adjusted by a propeller adjustment controller.

The aerial vehicle 1900 may also include one or more sensors 1906 configured to measure a sound generated by the aerial vehicle, as discussed herein. Likewise, the aerial vehicle may also include an imaging element 1908 or other detection component that obtains information regarding the environment in which the aerial vehicle is operating. Such information, alone or in combination with other environmental and/or flight plan information, may be used to select configurations and/or optimization factors for the different propulsion mechanisms. For example, different propulsion mechanism may be selected based on the sound profile generated by each propulsion mechanism when generating a desired lift. For example, the first propulsion mechanism 1902-1, to generate a desired lift may rotate at a first RPM and generate a first sound (PC-$1_S$). The second propulsion mechanism 1902-2, to generate the desired lift, may rotate at a second RPM that is different than the first RPM and generate a second sound (PC-$2_S$) that is different than the first sound (PC-$1_S$). The third propulsion mechanism 1902-3, to generate the desired lift, may rotate at a third RPM that is different than the first RPM and/or the second RPM and generate a third sound (PC-$3_S$) that is different than the first sound (PC-$1_S$) and/or the second sound (PC-$2_S$). The fourth propulsion mechanism 1902-4, to generate the desired lift, may rotate at a fourth RPM that is different than the first RPM, the second RPM, and/or the third RPM and generate a fourth sound (PC-$4_S$) that is different than the first sound (PC-$1_S$), the second sound (PC-$2_S$), and/or the third sound (PC-$3_S$). In some implementations, the propulsion mechanism configurations may be selected so that the first sound (PC-$1_S$), the second sound (PC-$2_S$), the third sound (PC-$3_S$), and/or the fourth sound (PC-$4_S$) cause interference with one another thereby altering an overall sound, or combined net effect produced by the operation of the aerial vehicle. The interference may be destructive or constructive. Destructive interference results in the sound canceling out or producing a reduced combined net effect that has a lower amplitude and/or frequency. Alternatively, the interference may be constructive and the sounds may combine to generate a combined net effect sound that is more appealing to humans and/or other animals. For example, the combined net effect sound may be a broadband sound, similar to white noise.

Configurations and/or selection of different propulsion mechanisms may be predetermined for different lifting forces. For example, a table of lifting forces and propeller configurations that will generate sounds that will cause interference with one another may be maintained by the aerial vehicle so that when a commanded lifting force is to be produced, the propeller configurations may be altered according to the table so that the combined net effect sound produced by the aerial vehicle is a result of interference between the sounds produced by the respective propulsion mechanisms.

In some implementations, the configurations of the propulsion mechanisms may be optimized based on the environment in which the aerial vehicle is operating. For example, if a human or other animal is detected by the imaging element 1908 to be within a defined distance of the aerial vehicle, the propulsion mechanisms may be optimized for sound. If the aerial vehicle is above a defined altitude or no humans or other animals are detected, the aerial vehicle may be optimized for efficiency.

Based on the determined optimization factors, instructions are sent to the respective propulsion mechanisms to configure the propulsion mechanisms accordingly. For example, as discussed above, expected sound profiles, resultant lifting forces, and efficiency profiles may be known for each motor RPM and propeller(s) configuration. Such information may be used to select a propulsion mechanism configuration for each propulsion mechanism so that a desired lifting force, sound profile, and/or optimization factors are provided by the different propulsion mechanisms.

In some implementations, the sensors 1906 may measure an overall sound generated by the aerial vehicle and send instructions to one or more of the propulsion mechanisms to make further adjustments to the propulsion mechanism to further alter and/or improve the overall sound generated by the aerial vehicle. In some implementations, a sensor 1906 may be positioned adjacent each propulsion mechanism to measure a sound generated by the propulsion mechanism such as sound PC-$1_{Ss}$ generated by propulsion mechanism 1902-1, PC-$2_{Ss}$ generated by propulsion mechanism 1902-2, PC-$3_{Ss}$ generated by propulsion mechanism 1902-3, and PC-$4_{Ss}$ generated by propulsion mechanism 1902-4.

Based on the measured sounds and the distance between each propulsion mechanism, alterations may be determined so that the different sounds cause interference and produce a combined net effect that is a reduced total sound and/or a sound that is more appealing to humans and/or other animals (e.g., broadband noise or white noise). In some implementations, the aerial vehicle 1900 may utilize the imaging element 1908 and/or other detection component, such as a distance determining element, to determine a position and distance of a human or other animal or object with respect to the aerial vehicle. Based on the position and distance between the aerial vehicle and the human, animal or other object, and the known distance between the propulsion mechanisms, propulsion mechanism configurations may be determined and selected that will produce sounds at a defined RPM so that when the sounds arrive at the position of the human, animal or other object, each sound will interfere with the sounds generated by the other propulsion mechanisms of the aerial vehicle to produce a combined net effect sound at the position of the human, animal or other object that is less than the individual sound of a single propulsion mechanism and/or a sound that is more appealing to humans, animals, etc. For example, based on the speed of sound, the known distances of the propulsion mechanisms, and the measured distance to the human, animal or other object, propulsion mechanism configurations may be determined that will result in the different sounds generated by the propulsion mechanisms being anti-sounds with respect to one another that will combine and cause destructive interference at the location of the human, animal, or other object, thereby reducing or otherwise altering the total sound perceived by the human, animal, or other object at that location.

Figure 20:
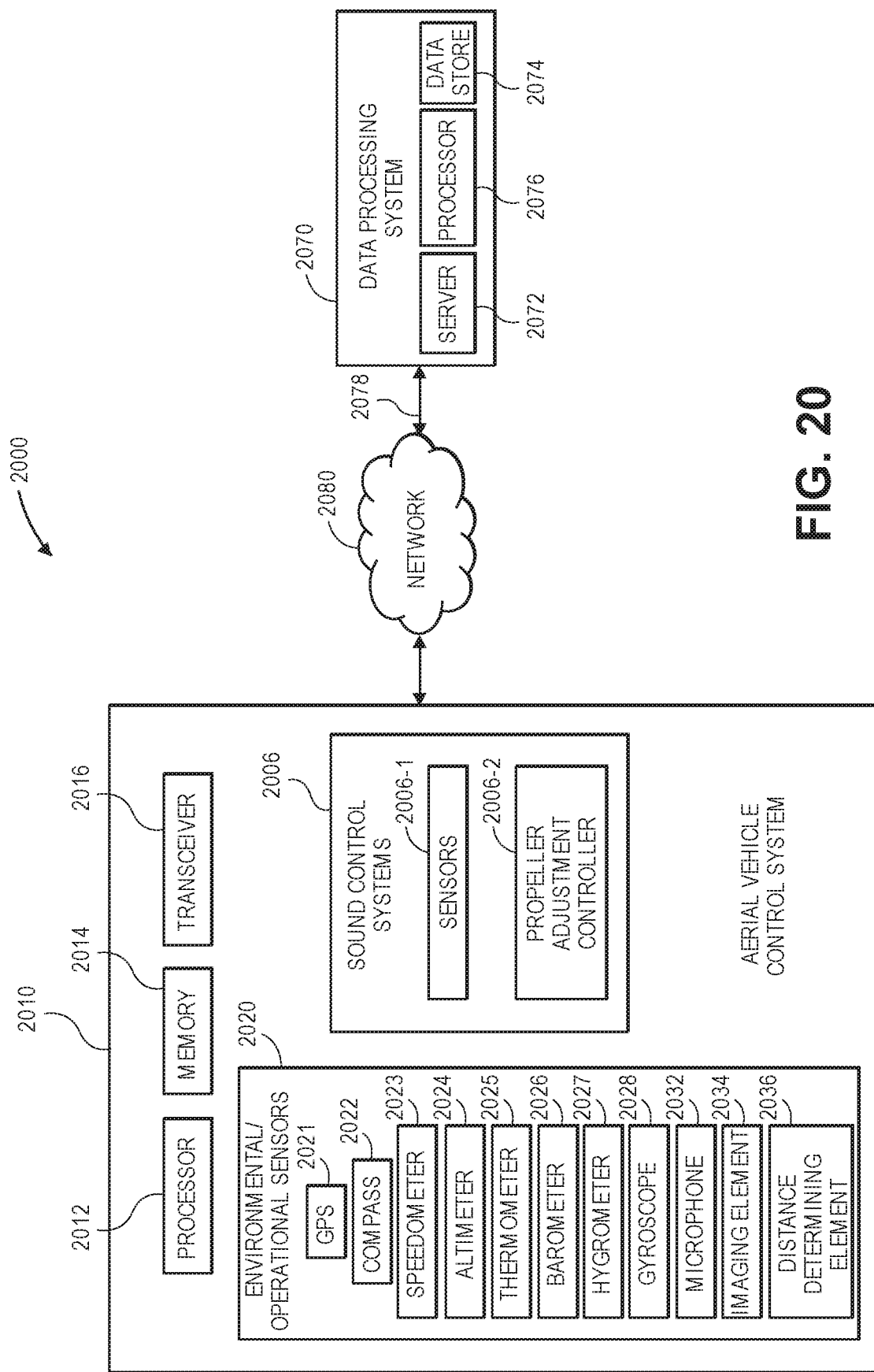
FIG. 20 is a block diagram of one system for active propeller adjustment and sound control, according to an implementation.

Referring to FIG. 20, illustrated is a block diagram of components of one system 2000 for active sound control, in accordance with an implementation. The system 2000 of FIG. 20 includes an aerial vehicle control system 2010 and a data processing system 2070 connected to one another over a network 2080. The aerial vehicle control system 2010 includes a processor 2012, a memory 2014 and a transceiver 2016, as well as a plurality of environmental or operational sensors 2020 and a plurality of sound control systems 2006. Each sound control system may include a propeller adjustment controller 2006-2 and optionally a sensor 2006-1.

The processor 2012 may be configured to perform any type or form of computing function, including but not limited to the execution of one or more machine learning algorithms or techniques. For example, the processor 2012 may control any aspects of the operation of the aerial vehicle and the one or more computer-based components thereon, including but not limited to the transceiver 2016, the environmental or operational sensors 2020, and/or the sound control systems 2006. The aerial vehicle may likewise include one or more control systems that may generate instructions for conducting operations thereof, e.g., for operating one or more rotors, motors, rudders, ailerons, flaps or other components provided thereon. Such control systems may be associated with one or more other computing devices or machines, and may communicate with the data processing system 2070 or one or more other computer devices over the network 2080, through the sending and receiving of digital data. The aerial vehicle control system 2010 further includes one or more memory or storage components 2014 for storing any type of information or data, e.g., instructions for operating the aerial vehicle, expected propeller blade sounds at different configurations and/or RPM, different expected propulsion mechanism sounds at different configurations, or information or data captured by one or more of the environmental or operational sensors 2020 and/or the sound sensors 2006-1.

The transceiver 2016 may be configured to enable the aerial vehicle to communicate through one or more wired or wireless means, e.g., wired technologies such as Universal Serial Bus (or "USB") or fiber optic cable, or standard wireless protocols, such as Bluetooth® or any Wireless Fidelity (or "Wi-Fi") protocol, such as over the network 2080 or directly.

The environmental or operational sensors 2020 may include any components or features for determining one or more attributes of an environment in which the aerial vehicle is operating, or may be expected to operate, including extrinsic information or data or intrinsic information or data. As is shown in FIG. 20, the environmental or operational sensors 2020 may include, but are not limited to, a Global Positioning System ("GPS") receiver or sensor 2021, a compass 2022, a speedometer 2023, an altimeter 2024, a thermometer 2025, a barometer 2026, a hygrometer 2027, a gyroscope 2028, a microphone 2032, an imaging element 2034, and/or a distance determining element 2036. The GPS sensor 2021 may be any device, component, system or instrument adapted to receive signals (e.g., trilateration data or information) relating to a position of the aerial vehicle from one or more GPS satellites of a GPS network (not shown). The compass 2022 may be any device, component, system, or instrument adapted to determine one or more directions with respect to a frame of reference that is fixed with respect to the surface of the Earth (e.g., a pole thereof).

The speedometer 2023 may be any device, component, system, or instrument for determining a speed or velocity of the aerial vehicle and may include related components such as pitot tubes, accelerometers, or other features for determining speeds, velocities, or accelerations.

The altimeter 2024 may be any device, component, system, or instrument for determining an altitude of the aerial vehicle, and may include any number of barometers, transmitters, receivers, range finders (e.g., laser or radar) or other features for determining heights. The thermometer 2025, the barometer 2026 and the hygrometer 2027 may be any devices, components, systems, or instruments for determining local air temperatures, atmospheric pressures, or humidities within a vicinity of the aerial vehicle. The gyroscope 2028 may be any mechanical or electrical device, component, system, or instrument for determining an orientation, e.g., the orientation of the aerial vehicle. For example, the gyroscope 2028 may be a traditional mechanical gyroscope having at least a pair of gimbals and a flywheel or rotor. Alternatively, the gyroscope 2028 may be an electrical component such as a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope, or any other type or form of electrical component for determining an orientation of the aerial vehicle. The microphone 2032 may be any type or form of transducer (e.g., a dynamic microphone, a condenser microphone, a ribbon microphone, a crystal microphone) configured to convert acoustic energy of any intensity and across any or all frequencies into one or more electrical signals, and may include any number of diaphragms, magnets, coils, plates, or other like features for detecting and recording such energy. The microphone 2032 may also be provided as a discrete component, or in combination with one or more other components, e.g., an imaging device, such as a digital camera. Furthermore, the microphone 2032 may be configured to detect and record acoustic energy from any and all directions.

The imaging element 2034 may be any form of imaging element such as a digital camera, a video camera, a thermal imaging camera, or any other form of imaging element that can obtain light based information about the environment in which the aerial vehicle is operating. Likewise, the distance determining element 2036 may be any form of distance determining element including, but not limited to, a time-of-flight sensor, an infrared sensor, a sound navigation and ranging (SONAR) sensor, a light detection and ranging (LIDAR) sensor, or the like.

Those of ordinary skill in the pertinent arts will recognize that the environmental or operational sensors 2020 may include any type or form of device or component for determining an environmental condition within a vicinity of the aerial vehicle in accordance with the present disclosure. For example, the environmental or operational sensors 2020 may include one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), altitude indicators, depth gauges, accelerometers or the like, and are not limited to the sensors 2021, 2022, 2023, 2024, 2025, 2026, 2027, 2028, 2032, 2034, and 2036 shown in FIG. 20.

The data processing system 2070 includes one or more physical computer servers 2072 having a plurality of data stores 2074 associated therewith, as well as one or more computer processors 2076 provided for any specific or general purpose. For example, the data processing system 2070 of FIG. 20 may be independently provided for the exclusive purpose of receiving, analyzing or storing sounds, anti-sounds, tables, such as Table 1 discussed above, and/or other information or data received from the aerial vehicle or, alternatively, provided in connection with one or more physical or virtual services configured to receive, analyze or store such sounds, information or data, as well as one or more other functions. The servers 2072 may be connected to or otherwise communicate with the data stores 2074 and the processors 2076. The data stores 2074 may store any type of information or data, including but not limited to sound information or data, and/or information or data regarding environmental conditions, operational characteristics, or positions, for any purpose. The servers 2072 and/or the computer processors 2076 may also connect to or otherwise communicate with the network 2080, as indicated by line 2078, through the sending and receiving of digital data. For example, the data processing system 2070 may include any facilities, stations or locations having the ability or capacity to receive and store information or data, such as media files, in one or more data stores, e.g., media files received from the aerial vehicle, or from one another, or from one or more other external computer systems (not shown) via the network 2080. In some implementations, the data processing system 2070 may be provided in a physical location. In other such implementations, the data processing system 2070 may be provided in one or more alternate or virtual locations, e.g., in a "cloud"-based environment. In still other implementations, the data processing system 2070 may be provided onboard one or more aerial vehicles, including but not limited to the aerial vehicle.

The network 2080 may be any wired network, wireless network, or combination thereof, and may comprise the Internet in whole or in part. In addition, the network 2080 may be a personal area network, local area network, wide area network, cable network, satellite network, cellular telephone network, or combination thereof. The network 2080 may also be a publicly accessible network of linked networks, possibly operated by various distinct parties, such as the Internet. In some implementations, the network 2080 may be a private or semi-private network, such as a corporate or university intranet. The network 2080 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and, thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle or the data processing system 2070 may use any web-enabled or Internet applications or features, or any other client-server applications or features including E-mail or other messaging techniques, to connect to the network 2080, or to communicate with one another, such as through short or multimedia messaging service (SMS or MMS) text messages. For example, the aerial vehicle may be adapted to transmit information or data in the form of synchronous or asynchronous messages to the data processing system 2070 or to any other computer device in real time or in near-real time, or in one or more offline processes, via the network 2080. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a non-transitory computer-readable medium that is within or accessible by computers or computer components such as the processor 2012 or the processor 2076, or any other computers or control systems utilized by the aerial vehicle or the data processing system 2070, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or include signals that may be downloaded through the Internet or other networks.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the implementations disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language, such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially," as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An aerial vehicle apparatus, comprising:
   a first motor configured to rotate a plurality of propeller blades such that each of the plurality of propeller blades generate a respective lifting force;
   a hub coupled to the first motor;
   a first propeller blade of the plurality of propeller blades coupled to and extending from the hub, the first propeller blade including:
      a leading edge;
      a trailing edge; and
      a surface area between the leading edge and the trailing edge; and
   a propeller adjustment controller configured to dynamically alter at least one of a size of the surface area, a shape of the surface area, a pitch of the first propeller blade, a camber of the first propeller blade, or a chord length of the first propeller blade;
   wherein the propeller adjustment controller includes:
      a spine that extends along a length of the first propeller blade; and
      a plurality of leading edge ribs that extend from the spine to the leading edge of the first propeller blade; and
      a plurality of trailing edge ribs that extend from the spine to the trailing edge of the first propeller blade;
   wherein the first propeller blade includes a plurality of adjustable propeller blade sections that may further be moved by the propeller adjustment controller between:
      a stacked position in which each of the plurality of adjustable propeller blade sections are vertically stacked; and
      a fanned position in which each of the plurality of adjustable propeller blade sections are displaced horizontally about the hub.

2. The aerial vehicle apparatus of claim 1, wherein a camber of the first propeller blade is increased when the spine is rotated.

3. The aerial vehicle apparatus of claim 1, wherein each of the plurality of adjustable propeller blade sections is physically joined to and moves with a respective adjustable propeller blade section of the plurality of adjustable propeller blade sections that is on an opposite side of the hub.

4. The aerial vehicle apparatus of claim 1,
   wherein each of the plurality of adjustable propeller blade sections is formed of a flexible material such that:
      in the stacked position, each of the plurality of adjustable propeller blade sections flexes and conforms to a curvature of an adjacent propeller blade section; and
      in the fanned position, the plurality of adjustable propeller blade sections flex and align to form an airfoil shape.

5. A propeller apparatus, comprising:
   a hub;
   a first propeller blade coupled to and extending from the hub, the first propeller blade including:
      a first leading edge;
      a first trailing edge;
      a first surface area between the first leading edge and the first trailing edge;
   a second propeller blade coupled to and extending from the hub, the second propeller blade including:
      a second leading edge;
      a second trailing edge;

a second surface area between the second leading edge and the second trailing edge; and a propeller adjustment controller configured to alter at least one of a size of the first surface area, a shape of the first surface area, a pitch of the first propeller blade, a camber of the first propeller blade, a chord length of the first propeller blade, a size of the second surface area, a shape of the second surface area, a pitch of the second propeller blade, a camber of the second propeller blade, or a chord length of the second propeller blade;

wherein the propeller adjustment controller includes:
- a first spine that extends a first length of the first propeller blade;
- a second spine that extends a second length of the second propeller blade;
- a first plurality of leading edge ribs that extend from the first spine to the first leading edge of the first propeller blade;
- a second plurality of leading edge ribs that extend from the second spine to the second leading edge of the second propeller blade;
- a first plurality of trailing edge ribs that extend from the first spine to the first trailing edge of the first propeller blade; and
- a second plurality of trailing edge ribs that extend from the second spine to the second trailing edge of the second propeller blade;

wherein the first propeller blade includes a first plurality of adjustable propeller blade sections that may further be moved by the propeller adjustment controller between a first stacked position and a first fanned position relative to the hub; and wherein the second propeller blade includes a second plurality of adjustable propeller blade sections that may further be moved by the propeller adjustment controller between a second stacked position and a second fanned position relative to the hub.

6. The propeller apparatus of claim 5, wherein:
each of the first plurality of adjustable propeller blade sections and the second plurality of adjustable propeller blade sections pivot about the hub.

7. The propeller apparatus of claim 5, wherein:
the first spine is rotatable between a first position and a second position such that at least one of the size of the first surface area, the shape of the first surface area, the pitch of the first propeller blade, the camber of the first propeller blade, or the chord length of the first propeller blade is different between the first position and the second position.

8. The propeller apparatus of claim 5, wherein:
each of the first plurality of adjustable propeller blade sections and the second plurality of adjustable propeller blade sections is formed of a flexible material such that:

in the first fanned position, the first plurality of adjustable propeller blade sections flex and align to form a first airfoil shape;

in the second fanned position, the second plurality of adjustable propeller blade sections flex and align to form a second airfoil shape;

in the first stacked position, each of the first plurality of adjustable propeller blade sections flexes and conforms to a curvature of an adjacent propeller blade section; and in the second stacked position, each of the second plurality of adjustable propeller blade sections flexes and conforms to a curvature of an adjacent propeller blade section.

9. A propeller apparatus, comprising:

a hub;

a propeller blade coupled to and extending from the hub, the propeller blade including:
- a leading edge;
- a trailing edge;
- a surface area between the leading edge and the trailing edge; and a propeller adjustment controller configured to alter at least one of a size of the surface area, a shape of the surface area, a pitch of the propeller blade, a camber of the propeller blade, or a chord length of the propeller blade;

wherein the propeller adjustment controller includes:
- a spine that extends a length of the propeller blade;
- a plurality of leading edge ribs that extend from the spine to the leading edge of the propeller blade; and
- a plurality of trailing edge ribs that extend from the spine to the trailing edge of the propeller blade;

wherein the propeller blade includes a plurality of adjustable propeller blade sections that may further be moved by the propeller adjustment controller between a stacked position and a fanned position relative to the hub.

10. The propeller apparatus of claim 9,
wherein each of the plurality of adjustable propeller blade sections is formed of a flexible material such that:

in the fanned position, the plurality of adjustable propeller blade sections flex and align to form an airfoil shape; and in the stacked position, each of the plurality of adjustable propeller blade sections flexes and conforms to a curvature of an adjacent propeller blade section.

11. The propeller apparatus of claim 10, wherein the flexible material comprises a memory metal that modifies shape responsive to application of an electrical charge.

* * * * *